(12) United States Patent
Rosenquist et al.

(10) Patent No.: US 9,580,559 B2
(45) Date of Patent: Feb. 28, 2017

(54) POLYDIORGANOSILOXANE-POLYCARBONATE BLOCK COPOLYMERS

(71) Applicant: SABIC GLOBAL TECHNOLOGIES B.V., Bergen op Zoom (NL)

(72) Inventors: Niles Richard Rosenquist, Evansville, IN (US); Fabrizio Micciche, Breda (NL); Jozua de Heer, Tholen (NL); Robert Dirk van de Grampel, Tholen (NL); James F. Hoover, Evansville, IN (US); Nathalie Gonzalez Vidal, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/026,064

(22) PCT Filed: Oct. 2, 2014

(86) PCT No.: PCT/US2014/058842
§ 371 (c)(1),
(2) Date: Mar. 30, 2016

(87) PCT Pub. No.: WO2015/051128
PCT Pub. Date: Apr. 9, 2015

(65) Prior Publication Data
US 2016/0237218 A1 Aug. 18, 2016

Related U.S. Application Data

(60) Provisional application No. 61/885,934, filed on Oct. 2, 2013, provisional application No. 61/885,955, filed on Oct. 2, 2013.

(51) Int. Cl.
| | | |
|---|---|---|
| C08G 64/18 | (2006.01) |
| C08G 77/448 | (2006.01) |
| C08L 69/00 | (2006.01) |
| C08L 83/10 | (2006.01) |

(52) U.S. Cl.
CPC ......... *C08G 77/448* (2013.01); *C08G 64/186* (2013.01); *C08L 69/00* (2013.01); *C08L 83/10* (2013.01)

(58) Field of Classification Search
CPC ............................ C08G 64/186; C08G 77/448
USPC .............................. 528/25, 29; 525/464, 474
See application file for complete search history.

(56) References Cited

U.S. PATENT DOCUMENTS

| | | |
|---|---|---|
| 6,723,864 B2 | 4/2004 | Silva et al. |
| 6,870,013 B2 | 3/2005 | Silva et al. |
| 2004/0039218 A1 | 2/2004 | Silva et al. |
| 2005/0032988 A1 | 2/2005 | Silva et al. |
| 2007/0238846 A1 | 10/2007 | Davis et al. |
| 2012/0271009 A1* | 10/2012 | Higaki ................ C08G 64/186 525/464 |

FOREIGN PATENT DOCUMENTS

| | | | |
|---|---|---|---|
| EP | 2 460 837 A1 | | 6/2012 |
| JP | 2014080496 | * | 5/2014 |
| WO | 2004/076512 A2 | | 9/2004 |
| WO | 2007/037888 A1 | | 4/2007 |

OTHER PUBLICATIONS

International Search Report and Written Opinion mailed in International Patent Application No. PCT/US2014/058842 (Dec. 4, 2014).

* cited by examiner

*Primary Examiner* — David Buttner
(74) *Attorney, Agent, or Firm* — Michael Best & Friedrich LLP

(57) ABSTRACT

Disclosed herein are polydiorganosiloxane-polycarbonate block copolymers having desirable optical properties, and methods of making such block copolymers. Also disclosed herein are analytical methods for evaluating hydroxyaryl end-capped polydialkylsiloxane monomers.

20 Claims, 6 Drawing Sheets

(a)

(b)

(c)

(a)

(b)

(a)

(b)

(a)

(b)

POLYDIORGANOSILOXANE-POLYCARBONATE BLOCK COPOLYMERS

CROSS-REFERENCE TO RELATED APPLICATION(S)

This is a U.S. national stage entry of International Patent Application No. PCT/US2014/058842, filed on Oct.2, 2014, which claims priority to U.S. Provisional patent application Ser. No. 61/885,955, filed on Oct. 2, 2013, and U.S. Provisional patent application Ser. No. 61/885,934, filed on Oct. 2, 2013.

TECHNICAL FIELD

The present disclosure is directed to polydiorganosiloxane-polycarbonate block copolymers having desirable optical properties, and methods of making such block copolymers.

BACKGROUND

Silicone-polycarbonate block copolymers have been recognized for their ductility and impact strength at low temperatures, as well as flame retardance. However, the properties of such block copolymers can vary significantly based on the source of the silicone starting materials. Furthermore, silicone materials such as hydroxyaryl end-capped polydiorganosiloxane polymers can be challenging to evaluate using traditional methods, due to the variability of refractive index and ultraviolet absorption signals across the molecular weight distribution of the polymers.

There is a need for polydiorganosiloxane-polycarbonate block copolymers having consistent optical properties, and methods of producing such block copolymers. Furthermore, there is a need for analytical methods to completely characterize the properties of silicone polymers such as hydroxyaryl end-capped polydiorganosiloxanes.

SUMMARY

In one aspect, disclosed herein is a process for preparing a polydiorganosiloxane-polycarbonate block copolymer, the process comprising:
(a) providing a composition comprising hydroxyaryl end-capped polydiorganosiloxane monomers having the following formula (Ia):

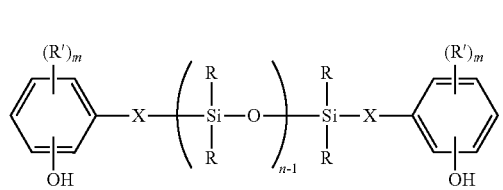

wherein:
each R is independently a $C_1$-$C_{13}$ monovalent organic group;
each X is independently a $C_2$-$C_4$ alkylenyl group;
each R' is independently selected from the group consisting of halo, cyano, nitro, $C_1$-$C_8$ alkyl, $C_1$-$C_8$ alkoxy, $C_1$-$C_8$ thioalkoxy, $C_2$-$C_8$ alkenyl, $C_2$-$C_8$ alkenyloxy, $C_3$-$C_8$ cycloalkyl, $C_3$-$C_8$ cycloalkyloxy, $C_6$-$C_{10}$ aryl, $C_6$-$C_{10}$ aryloxy, $C_7$-$C_{12}$ arylalkyl, and $C_7$-$C_{12}$ arylalkoxy;
each m is independently 0, 1, 2, 3 or 4; and
n is about 2 to about 200;
wherein the composition has a polydispersity index (Mw/Mn) of less than 2.2, as measured by size exclusion chromatography with ultraviolet (UV) and refractive index (RI) detection; and
wherein the composition has a % low molecular weight fraction of less than 15%; and
(b) reacting the composition with a carbonate precursor and a dihydroxy monomer of formula (ia):

$$HO-R^1-OH \qquad (ia)$$

wherein $R^1$ comprises an aliphatic, alicyclic, or aromatic group, or any combination thereof;
to form the polydiorganosiloxane-polycarbonate block copolymer.

In another aspect, disclosed herein is a process for preparing a polydiorganosiloxane-polycarbonate block copolymer, the process comprising:
(a) providing a composition comprising hydroxyaryl end-capped polydiorganosiloxane monomers having the following formula (Ia):

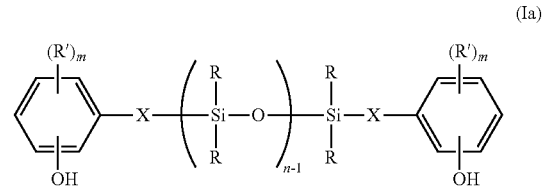

wherein:
each R is independently a $C_1$-$C_{13}$ monovalent organic group;
each X is independently a $C_2$-$C_4$ alkylenyl group;
each R' is independently selected from the group consisting of halo, cyano, nitro, $C_1$-$C_8$ alkyl, $C_1$-$C_8$ alkoxy, $C_1$-$C_8$ thioalkoxy, $C_2$-$C_8$ alkenyl, $C_2$-$C_8$ alkenyloxy, $C_3$-$C_8$ cycloalkyl, $C_3$-$C_8$ cycloalkyloxy, $C_6$-$C_{10}$ aryl, $C_6$-$C_{10}$ aryloxy, $C_7$-$C_{12}$ arylalkyl, and $C_7$-$C_{12}$ arylalkoxy;
each m is independently 0, 1, 2, 3 or 4; and
n is about 2 to about 200;
wherein the composition has a polydispersity index (Mw/Mn) of less than 2.3, as measured by size exclusion chromatography with ultraviolet (UV) and refractive index (RI) detection; and
wherein the composition has a % low molecular weight fraction of less than 15%; and
(b) reacting the composition with a carbonate precursor and a dihydroxy monomer of formula (ia):

$$HO-R^1-OH \qquad (ia)$$

wherein $R^1$ comprises an aliphatic, alicyclic, or aromatic group, or any combination thereof;
to form the polydiorganosiloxane-polycarbonate block copolymer.

Other aspects and embodiments will become apparent in light of the following description and drawings.

DETAILED DESCRIPTION

Figure 1:
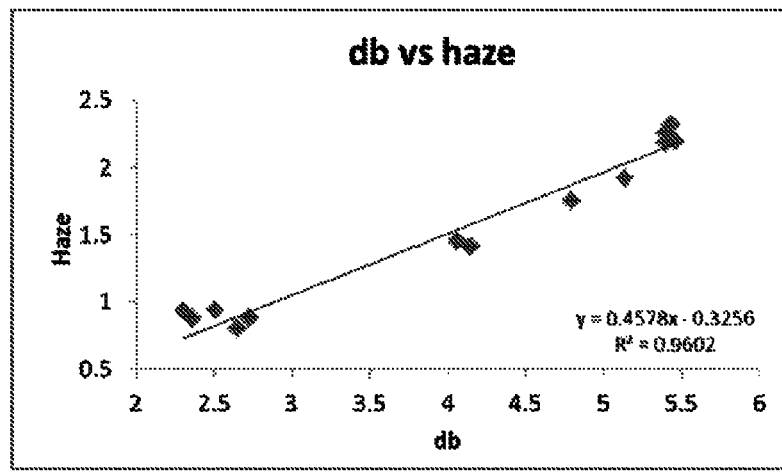
FIG. 1 shows graphs of: a) the measured % haze values for a 3.15 mm molded plaque prepared from a polydimethylsiloxane-polycarbonate block copolymer, vs. measured Db values for the same molded plaque; b) measured Db values as described above vs. polydispersity index (PDI) of the eugenol end-capped polydimethylsiloxane starting material used to prepare the block copolymer; and c) measured % haze values as described above vs. the PDI of the eugenol end-capped polydimethylsiloxane starting material used to prepare the block copolymer.
Figure 1:
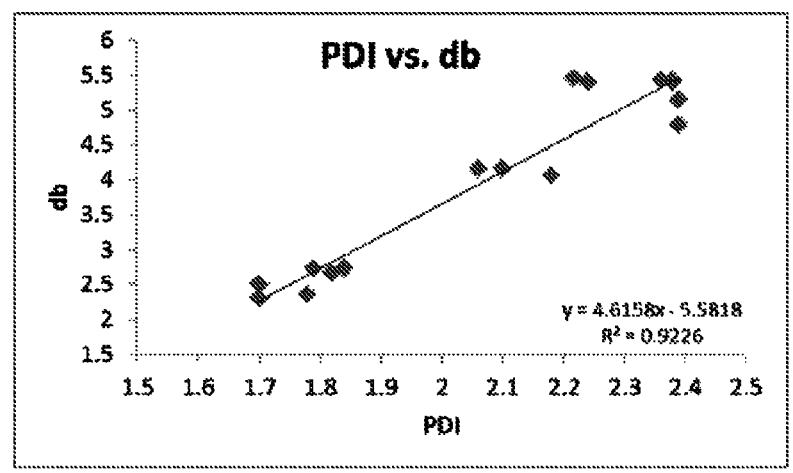
Figure 1:
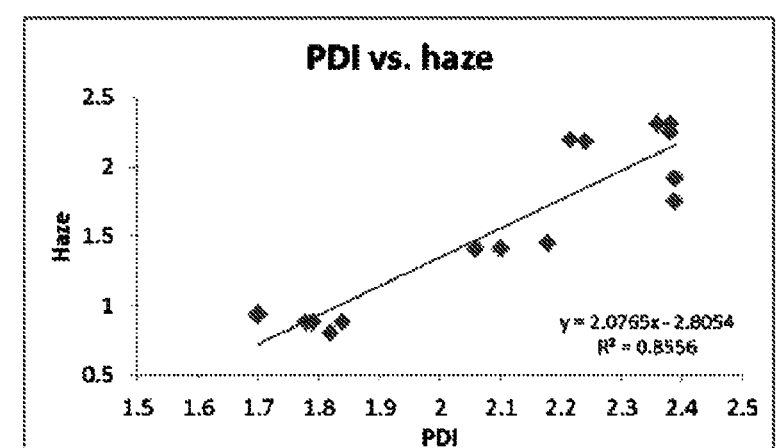

The present disclosure is directed to polydiorganosiloxane-polycarbonate block copolymers, and methods for producing the same. Despite extensive understanding of the effects of certain parameters on the final properties of such block copolymers, such as the length of the polydiorganosiloxane block, the loading of the polydiorganosiloxane in the final block copolymer, and the overall molecular weight of the block copolymer, significant variations in the optical resin quality may be observed when copolymers are prepared from different batches of polydiorganosiloxane monomers. Described herein is an analytical tool that combines size exclusion chromatography (SEC) with ultra-violet (UV) and refractive index (RI) detection, which may be used to obtain detailed information on the chemical composition of the polydiorganosiloxane monomers that are used to form the final block copolymers. The analytical tool involves indirect classical least squares (ILCS) calculations on the SEC-UV and SEC-RI data, to measure and calculate both the molecular weight distribution (MwD), and content and chemical composition distribution (CCD) of the components of the polydiorganosiloxane monomers. The calculations allow direct correlations to be made between the polydispersity index (PDI) and the percentage of high and low molecular weight fractions of the polydiorganosiloxanes, and key optical properties of the final block copolymers such as % haze.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The terms "first," "second," "third," and the like, as used herein, do not denote any order, quantity, or importance, but rather are used to distinguish one element from another.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "% low molecular weight fraction," as used herein regarding a composition comprising polydiorganosiloxane monomers (e.g., hydroxyaryl end-capped polydiorganosiloxanes, such as eugenol end-capped polydimethylsiloxanes), refers to the percentage of polymers in the composition having a weight average molecular weight of less than or equal to 3,000 g/mol based on a polystyrene standard curve, based on a graph of the concentration of eugenol end groups in the polydiorganosiloxane monomers at each retention time point. The % low molecular weight fraction can be determined by first determining the total area under the curve of a graph of the concentration of repeating diorganosiloxane units (e.g., dimethylsiloxane units —(Si(CH$_3$)$_2$—O)—) in the polydiorganosiloxane monomers at each retention time point, then calculating the area under the curve for the fraction that is less than or equal to 3,000 g/mol based on the polystyrene standard curve. The % low molecular weight fraction corresponds to the ratio of the area under the curve for the fraction that is less than or equal to 3,000 g/mol based on the polystyrene standard curve, divided by the total area under the curve, multiplied by 100.

The term "% high molecular weight fraction," as used herein regarding a composition comprising polydiorganosiloxane monomers (e.g., hydroxyaryl end-capped polydiorganosiloxanes, such as eugenol end-capped polydimethylsiloxanes), refers to the percentage of polymers in the composition having a weight average molecular weight of more than about 22,000 g/mol based on a polystyrene standard curve. The % high molecular weight fraction can be determined by first determining the total area under the curve of a graph of the concentration of repeating diorganosiloxane units (e.g., dimethylsiloxane units —Si(CH$_3$)$_2$—O)—) in the polydiorganosiloxane monomers at each retention time point, then calculating the area under the curve for the fraction that is higher than about 22,000 g/mol based on the polystyrene standard curve. The % high molecular weight fraction corresponds to the ratio of the area under the curve for the fraction that is higher than about 22,000 g/mol based on the polystyrene standard curve, divided by the total area under the curve, multiplied by 100.

"Alkenyl" as used herein may mean a linear, branched, or cyclic hydrocarbyl group having at least one carbon-carbon double bond, such as a vinyl group, an allyl group, an isopropenyl group, or the like.

"Alkoxy" as used herein may mean the structure —OR, wherein R is alkyl as defined herein.

"Alkyl" as used herein may mean a linear, branched, or cyclic hydrocarbyl group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, or the like.

"Alkylene" or "alkylenyl" as used herein may mean a divalent alkyl, as defined herein, such as —CH$_2$—, —CH$_2$CH$_2$—, —CH$_2$CH$_2$CH$_2$—, —CH$_2$CH(CH$_3$)CH$_2$—, or the like.

"Alkynyl" as used herein may mean a linear, branched, or cyclic hydrocarbyl group having at least one carbon-carbon triple bond, such as an ethynyl group, a propargyl group, or the like.

"Aryl" as used herein may mean substituted or unsubstituted aryl radicals containing from 6 to 36 ring carbon atoms. Examples of aryl include, but are not limited to, a phenyl group, a naphthyl group, a bicyclic hydrocarbon fused ring system, or a tricyclic hydrocarbon fused ring system wherein one or more of the rings are a phenyl group.

"Arylene" or "arylenyl" as used herein may mean a divalent aryl, as defined herein, such as o-phenylene, m-phenylene or p-phenylene.

"Aryloxy" as used herein may refer to the structure —OR, wherein R is aryl as defined herein.

"Arylalkyl" as used herein may mean an aryl, as defined herein, appended to the parent molecular moiety through an alkyl, as defined herein.

"Arylalkoxy" as used refers to the structure —OR, wherein R is arylalkyl as defined herein.

"Block copolymer molecular weight" as used herein refers to the molecular weight of the block copolymer, which in one embodiment is based on a polystyrene standard curve, as determined by size exclusion chromatography.

In general, polymer molecular weights can be measured in a variety of ways. For example, molecular weights of polymers such as block copolymers can be measured using mass spectrometry. In some embodiments, block copolymer molecular weights can be measured using size exclusion chromatography (SEC). In embodiments using SEC, a standard curve can be generated to correlate one or more retention times with one or more molecular weights. In such embodiments, processes may include a step of generating a standard curve using polymer samples of known molecular weights, such as polystyrene standards or polycarbonate standards.

"Copolymer" as used herein may mean a polymer derived from two or more structural units or monomeric species, as opposed to a homopolymer, which is derived from only one structural unit or monomeric species.

"C$_3$-C$_8$ cycloalkyl" as used herein may mean cyclopropyl, cyclobutyl, cyclopentyl, cyclohexyl, cycloheptyl or cyclooctyl.

"C$_3$-C$_8$ cycloalkyloxy" as used herein refers to the structure —OR, wherein R is C$_3$-C$_8$ cycloalkyl as defined herein.

"Db" as used herein refers to a difference in a in the "b*" value between a sample and a standard reference color along the yellowness-blueness axis, as measured using a spectrophotometer.

"Halo" as used herein may be a substituent to which the prefix is attached is substituted with one or more independently selected halogen radicals. For example, "C$_1$-C$_6$ haloalkyl" means a C$_1$-C$_6$ alkyl substituent wherein one or more hydrogen atoms are replaced with independently selected halogen radicals. Non-limiting examples of C$_1$-C$_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, bromine or iodine atom.

"Haze" as used herein may mean that percentage of transmitted light, which in passing through a specimen deviates from the incident beam by forward scattering. Unless otherwise specified herein, percent haze (which may be abbreviated % haze) is measured according to ASTM D1003-07 using a Gardner Haze Gard instrument.

"Heteroaryl" as used herein may mean any aromatic heterocyclic ring which may comprise an optionally benzocondensed 5 or 6 membered heterocycle with from 1 to 3 heteroatoms selected among N, O or S. Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazotyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Member atom" as used herein refers to a polyvalent atom (e.g., a C, O, N, or S atom) in a chain that constitutes a part of the chain. Member atoms will be substituted up to their normal valence. For example, in a chain having one carbon atom as a member atom, the carbon atom will be further substituted with two additional groups, such as hydrogen atoms or other substituents. For example, a chain having one carbon atom as a member atom could be —CH$_2$—, —CH(CH$_3$)—, or —C(CH$_3$)$_2$—.

"Percent transmission" or "% transmission" as used herein may mean the ratio of transmitted light to incident light and may be measured according to ASTM D 1003-07.

"Polycarbonate" as used herein may mean an oligomer or polymer comprising residues of one or more polymer structural units, or monomers, joined by carbonate linkages.

"Polydispersity index" or "PDI" as used herein refers to the ratio of weight average molecular weight ($M_w$) to number average molecular weight ($M_n$). In equation form, PDI=$M_w/M_n$.

"Straight or branched $C_1$-$C_3$ alkyl" or "straight or branched $C_1$-$C_3$ alkoxy" as used herein may mean methyl, ethyl, n-propyl, isopropyl, methoxy, ethoxy, n-propoxy and isopropoxy.

"Thioalkoxy" as used herein may refer to the structure —SR, wherein R is alkyl as defined herein.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein. The terms "structural unit" and "monomer" are used in their broadest sense and are not restricted to monomeric units, but includes oligomers or partial polymers that are capable of further polymerization. For example, these terms may be used to refer to dihydroxy compounds including multiple diorganosiloxane repeat units.

Abbreviations of measurement values are defined as follows: nm—nanometer; mm—millimeter; ppm—parts per million; g—gram; L—liter; mL—milliliter; min—minute; hr—hour; Mw—molecular weight; g/mol—grams per mole.

Polymers disclosed herein include polydiorganosiloxane-polycarbonate block copolymers. A block copolymer is formed from two or more different monomer blocks joined together to form the backbone of the polymer. When only two blocks are present, the block copolymer is called a diblock copolymer. Structures A and B below provide two illustrations of block copolymers made from silicone blocks S and polycarbonate blocks C:

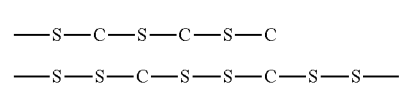

The block copolymers disclosed herein may be the reaction products of at least one hydroxyaryl end-capped polydiorganosiloxane, with at least one bisphenol compound and a carbonate precursor. The hydroxyaryl end-capped polydiorganosiloxanes that are used to prepare the block copolymers described herein have a PDI of less than 2.3 or less than 2.2, and produce block copolymers that have desirable optical properties such as reduced haze.

The block copolymers disclosed herein include polydiorganosiloxane blocks, which may be derived from diorganosiloxane-containing dihydroxy compounds (also referred to herein as "hydroxyaryl end-capped polydiorganosiloxanes" or "hydroxyaryl end-capped polydiorganosiloxane monomers") that contain diorganosiloxane units of formula (a):

and hydroxyaryl end-capping groups having the formula -Ph(OH)(R')$_m$.

In formula (a), each occurrence of R is the same or different, and is a $C_1$-$C_{13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. For example, in some embodiments, R can be a $C_1$-$C_{13}$ alkyl group, such as a $C_1$-$C_4$ alkyl group, for example methyl, ethyl, n-propyl, iso-propyl or n-butyl. The foregoing groups can be fully or partially halogenated with fluorine, chlorine, bromine, or iodine, or a combination thereof. Combinations of the foregoing R groups can be used in the same polydiorganosiloxane block.

The value of n in formula (a) can vary widely depending on the type and relative amount of each of the different units in the polydiorganosiloxane block, the desired properties of the block copolymer, and other such considerations. Generally, n can have an average value of about 2 to about 200, specifically about 30 to about 100, or about 70 to about 110, or about 40 to about 50, or about 43 to 47, or about 41 to 45.

Where n is of a lower value, e.g., less than or equal to 40, it can be desirable to use a relatively larger amount of the units containing the polydiorganosiloxane when preparing the block copolymers described herein. Conversely, where n is of a higher value, e.g., greater than about 40, it can be desirable to use a relatively lower amount of the units containing the polydiorganosiloxane when preparing the block copolymers described herein. The notation "Dn" will be used herein to refer to the average number of diorganosiloxane units; for example, D45 means that the polydiorganosiloxane blocks have an average value for n of 45.

In the hydroxyaryl end-capping groups, each R' can be the same or different, and is optionally halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy. Each m is independently, for example, 0, 1, 2, 3, or 4.

In one embodiment, the polydiorganosiloxane blocks are provided by repeating structural units of formula (b):

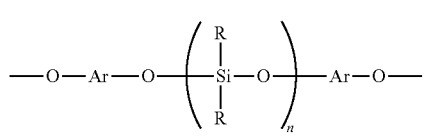

(b)

wherein n is as defined above; each R is the same or different, and is as defined above; and each Ar is the same or different, and Ar is one or more $C_6$-$C_{30}$ aromatic group(s), or one or more alkyl containing $C_6$-$C_{30}$ aromatic group(s), wherein the bonds are directly connected to an aromatic moiety. The —O—Ar—O— groups in formula (b) can be, for example, a $C_6$-$C_{30}$ dihydroxyaromatic compound. Combinations comprising at least one of the foregoing dihydroxyaromatic compounds can also be used. Exemplary dihydroxyaromatic compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl) cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polymers comprising such units can be derived from the corresponding dihydroxy compound of formula (c):

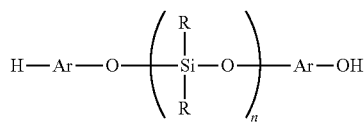

(c)

wherein Ar and n are as described above. Compounds of formula (c) can be obtained by the reaction of a dihydroxyaromatic compound with, for example, an alpha, omega-bis-acetoxy-polydiorganosiloxane compound under phase transfer conditions. Compounds of formula (c) can also be obtained from the condensation product of a dihydroxyaromatic compound, with, for example, an alpha, omega bis-chloro-polydimethylsiloxane compound in the presence of an acid scavenger.

In a specific embodiment, Ar from formula (c) is derived from resorcinol, and the polydiorganosiloxane repeating units are derived from a dihydroxy aromatic compound of formula (d):

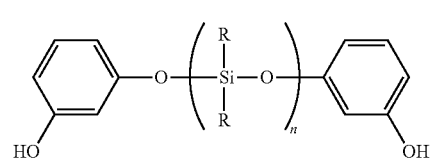

(d)

or, wherein Ar is derived from bisphenol-A, and the polydiorganosiloxane repeating units are derived from a dihydroxy aromatic compound of formula (e):

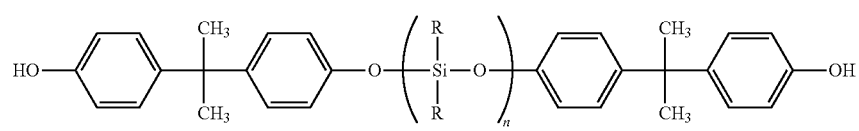

(e)

wherein n has an average value of between 20 and 75.

In another embodiment, polydiorganosiloxane blocks comprise units of formula (f):

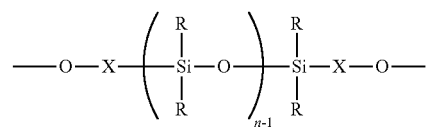

(f)

wherein R and n are as described above, and each X is independently a divalent $C_1$-$C_{30}$ organic group such as a $C_1$-$C_{30}$ alkylene, $C_6$-$C_{30}$ arylene, or a divalent $C_7$-$C_{30}$ alkylaryl group. The polydiorganosiloxane blocks corresponding to formula (f) are derived from the corresponding dihydroxy compound of formula (g):

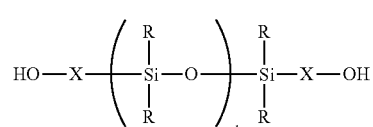

(g)

wherein R and n and X are as described for formula (f).

In a specific embodiment, the polydiorganosiloxane blocks are provided by repeating structural units of formula (I):

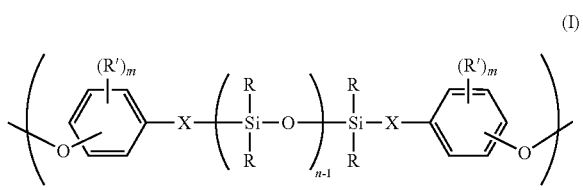

wherein R, R' and n are as defined above. X in formula (I) may be a divalent $C_2$-$C_8$ alkylenyl group (e.g., a $C_2$-$C_4$ alkylenyl group).

In one embodiment, R' of formula (I) is bromo or chloro, an alkyl group such as methyl, ethyl, or propyl, an alkoxy group such as methoxy, ethoxy, or propoxy, or an aryl group such as phenyl, chlorophenyl, or tolyl; m is 0 to 4; X is a dimethylene, trimethylene or tetramethylene group; and R is a $C_1$-$C_8$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R' is methoxy, m is one, X is a divalent $C_2$-$C_4$ alkylenyl group, and R is methyl.

Polydiorganosiloxane-polycarbonates comprising units of formula (I) can be derived from the corresponding dihydroxy polydiorganosiloxane monomer (Ia):

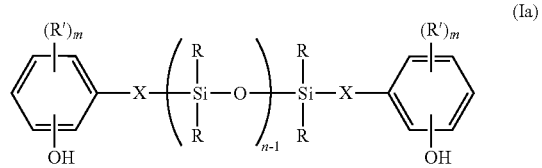

wherein each of R, X, R', m and n are as described above. Such dihydroxy polydiorganodisiloxanes can be made by effecting a platinum-catalyzed addition between a siloxane hydride of formula (h):

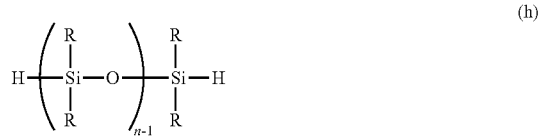

wherein R and n are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

In a specific embodiment, the polydiorganosiloxane blocks are derived from a polydiorganosiloxane monomer having the structure (Ib):

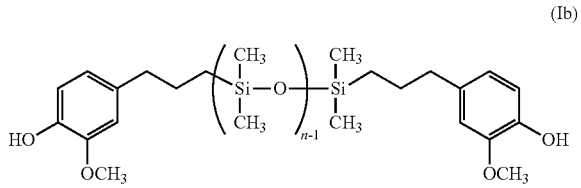

wherein n has an average value of between 20 and 75.

In another specific embodiment, the polydiorganosiloxane blocks are derived from a polydiorganosiloxane monomer having the structure (Ic):

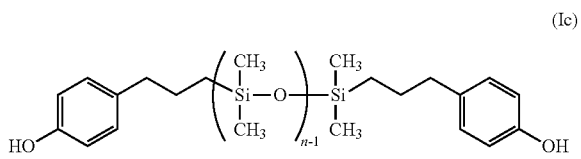

wherein n has an average value of between 20 and 75.

In another specific embodiment, the polydiorganosiloxane blocks are derived from a polydiorganosiloxane monomer having the structure (Id):

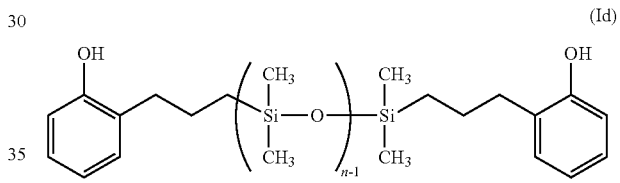

wherein n has an average value of between 20 and 75.

The polydiorganosiloxane block may make up about 2 wt % to about 25 wt % or about 2 wt % to about 15 wt % of the block copolymer, based on the total weight of the polydiorganosiloxane-polycarbonate block copolymer. For example, the polydiorganosiloxane block may make up about 2 wt % to about 8 wt %, or about 4 wt % to about 8 wt %, or about 5 wt % to about 7 wt %. In embodiments, the polydiorganosiloxane block may make up 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 10.5 wt %, 11.0 wt %, 11.5 wt %, 12.0 wt %, 12.5 wt %, 13.0 wt %, 13.5 wt %, 14.0 wt %, 14.5 wt %, or 15.0 wt % of the block copolymer, based on the total weight of the polydiorganosiloxane-polycarbonate block copolymer.

When used to form block copolymers described herein, the polydiorganosiloxane monomer (e.g., a compound of formula (c), (d), (e), (g), (Ia), (Ib), (Ic) and (Id)) may have a PDI of less than or equal to 2.3. For example, a polydiorganosiloxane monomer may have a PDI of less than or equal to 2.2, less than or equal to 2.1, less than or equal to 2.0, less than or equal to 1.9, less than or equal to 1.8, less than or equal to 1.7, less than or equal to 1.6, less than or equal to 1.5, less than or equal to 1.4, less than or equal to 1.3, less than or equal to 1.2, or less than or equal to 1.1. For example, a polydiorganosiloxane monomer may have a PDI of about 2.2, about 2.1, about 2.0, about 1.9, about 1.8, about 1.7, about 1.6, about 1.5, about 1.4, about 1.3, about 1.2, about 1.1 or about 1.0.

When used to form block copolymers described herein, the polydiorganosiloxane monomer (e.g., a compound of formula (c), (d), (e), (g), (Ia), (Ib), (Ic) and (Id)) may be analyzed using an analytical method described herein, e.g., using SEC with UV and RI detection followed by ICLS analysis. The analytical method can determine the chemical content distribution of polydiorganosiloxane units (e.g., units of formula (a)) at each retention time point, and the chemical content distribution of the end groups (e.g., units of the formula -Ph(OH)(R')$_m$) at each retention time point. Based on the chemical content distributions, the polydiorganosiloxane monomer that is used to form a block copolymer described herein may have low concentrations of high molecular weight fractions and low molecular weight fractions, based on polystyrene standard curves.

For example, in an exemplary embodiment, a polydiorganosiloxane monomer has formula (Ib), and n has an average value of about 45. Based on a graph of concentration of eugenol end groups in the polymers of formula (Ib) at each retention time point, the percentage of polymers having a molecular weight of less than or equal to 3000 g/mol based on a polystyrene standard curve may be less than or equal to 15%, e.g., less than or equal to 15%, less than or equal to 14.5%, less than or equal to 14%, less than or equal to 13.5%, less than or equal to 13%, less than or equal to 12.5%, less than or equal to 12%, less than or equal to 11.5%, less than or equal to 11%, less than or equal to 10.5%, less than or equal to 10%, less than or equal to 9.5%, less than or equal to 9.0%, less than or equal to 8.5%, less than or equal to 8.0%, less than or equal to 7.5%, less than or equal to 7.0%, less than or equal to 6.5%, less than or equal to 6.0%, less than or equal to 5.5%, or less than or equal to 5.0%. Based on a graph of concentration of repeating dimethylsiloxane units in the polymers of formula (Ib) at each retention time point, the percentage of polymers having a molecular weight of greater than about 22000 g/mol based on a polystyrene standard curve may be less than or equal to 28%, e.g., less than or equal to 28%, less than or equal to 27.5%, less than or equal to 27%, less than or equal to 26.5%, less than or equal to 26%, less than or equal to 25.5%, less than or equal to 25%, less than or equal to 24.5%, less than or equal to 24%, less than or equal to 23.5%, less than or equal to 23%, less than or equal to 22.5%, less than or equal to 22%, less than or equal to 21.5%, less than or equal to 21%, less than or equal to 20.5%, less than or equal to 20%, less than or equal to 19.5%, less than or equal to 19%, less than or equal to 18.5%, less than or equal to 18%, less than or equal to 17.5%, less than or equal to 17%, less than or equal to 16.5%, less than or equal to 16%, less than or equal to 15.5%, less than or equal to 15%, less than or equal to 14.5%, less than or equal to 14%, less than or equal to 13.5%, less than or equal to 13%, less than or equal to 12.5%, less than or equal to 12%, less than or equal to 11.5%, less than or equal to 11%, less than or equal to 10.5%, or less than or equal to 10%.

The block copolymers of the present disclosure also include polycarbonate blocks. The polycarbonate blocks may have repeating structural units of the formula (i):

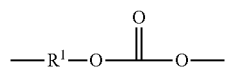
(i)

wherein $R^1$ may comprise any suitable organic group, such as an aliphatic, alicyclic, or aromatic group, or any combination thereof. In certain embodiments, $R^1$ in the carbonate units of formula (i) may be a $C_6$-$C_{36}$ aromatic group wherein at least one moiety is aromatic. The polycarbonate blocks having structural units of the formula (i) may be derived from a compound having formula (ia):

HO—$R^1$—OH    (ia)

In one embodiment, each $R^1$ is an aromatic organic group, for example a group of the Formula (ii):

-$A^1$-Y-$A^2$-    (ii)

wherein each of $A^1$ and $A^2$ is a monocyclic divalent arylene group and Y is a bridging group having one or two member atoms that separate $A^1$ from $A^2$. In an exemplary embodiment, one member atom separates $A^1$ from $A^2$, with illustrative examples of such groups including —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging group Y may be a hydrocarbon group or a saturated hydrocarbon group such as methylene, cyclohexylidene, or isopropylidene.

Each $R^1$ may be derived from a dihydroxy monomer unit. The dihydroxy monomer unit may have formula (IIa):

HO-$A^1$-Y-$A^2$-OH    (IIa)

wherein Y, $A^1$ and $A^2$ are as described above. The dihydroxy monomer unit of formula (IIa) may include bisphenol compounds of formula (iii):

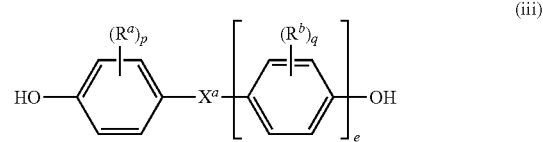
(iii)

wherein $X^a$ may be a bridging group connecting the two hydroxy-substituted aromatic groups, where the bridging group and the hydroxy substituent of each $C_6$ arylene group are disposed ortho, meta, or para (specifically para) to each other on the $C_6$ arylene group. For example, the bridging group $X^a$ may be single bond, —O—, —S—, —C(O)—, or a $C_1$-$C_{18}$ organic group. The $C_1$-$C_{18}$ organic bridging group may be cyclic or acyclic, aromatic or non-aromatic, and can further comprise heteroatoms such as halogens, oxygen, nitrogen, sulfur, silicon, or phosphorous. The $C_1$-$C_{18}$ organic group can be disposed such that the $C_6$ arylene groups connected thereto are each connected to a common alkylidene carbon or to different carbons of the $C_1$-$C_{18}$ organic bridging group. $R^a$ and $R^b$ may each represent a halogen, $C_r$-$C_{12}$ alkyl group or combination thereof. For example, $R^a$ and $R^b$ may each be a $C_1$-$C_3$ alkyl group, specifically methyl, disposed meta to the hydroxy group on each arylene group. The designation (e) is 0 or 1. The numbers p and q are each independently integers of 0 to 4. It will be understood that $R^a$ is hydrogen when p is 0, and likewise $R^b$ is hydrogen when q is 0.

In certain embodiments, $X^a$ may be substituted or unsubstituted $C_3$-$C_{18}$ cycloalkylidene, a $C_1$-$C_{25}$ alkylidene of formula —C($R^c$)($R^d$)— wherein $R^c$ and $R^d$ are each independently hydrogen, $C_1$-$C_{12}$ alkyl, $C_1$-$C_{12}$ cycloalkyl, $C_7$-$C_{12}$ arylalkyl, $C_1$-$C_{12}$ heteroalkyl, or cyclic $C_7$-$C_{12}$ heteroaryl-alkyl, or a group of the formula —C(=R$^e$)— wherein R$^e$ is a divalent C$_1$-C$_{12}$ hydrocarbon group. This may include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein X$^a$ is a substituted cycloalkylidene is the cyclohexylidene-bridged, alkyl-substituted bisphenol of formula (iv):

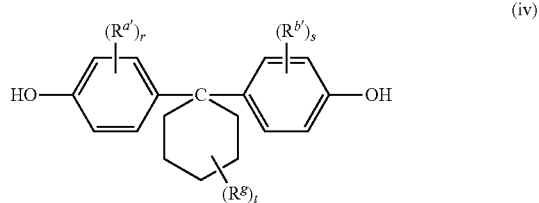

(iv)

wherein R$^{a'}$ and R$^{b'}$ are each independently C$_1$-C$_{12}$ alkyl, R$^g$ is C$_1$-C$_{12}$ alkyl or halogen, r and s are each independently 1 to 4, and t is 0 to 10. R$^{a'}$ and R$^{b'}$ may be disposed meta to the cyclohexylidene bridging group. The substituents R$^{a'}$, R$^{b'}$ and R$^g$ may, when comprising an appropriate number of carbon atoms, be straight chain, cyclic, bicyclic, branched, saturated, or unsaturated. For example, R$^{a'}$, R$^{b'}$ and R$^g$ may be each independently C$_1$-C$_4$ alkyl, r and s are each 1, and t is 0 to 5. In another example, R$^{a'}$, R$^{b'}$ and R$^g$ may each be methyl, r and s are each 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC™ trade name.

In another example, X$^a$ may be a substituted C$_3$-C$_{18}$ cycloalkylidene of the formula (v):

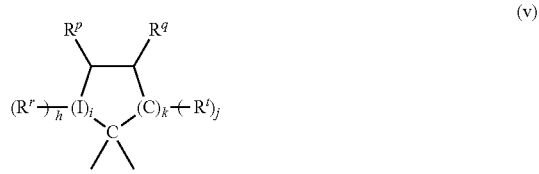

(v)

wherein R$^r$, R$^p$, R$^q$ and R$^t$ are each independently hydrogen, halogen, oxygen, or C$_1$-C$_{12}$ organic groups; I is a direct bond, a carbon, or a divalent oxygen, sulfur, or —N(Z)— where Z is hydrogen, halogen, hydroxy, C$_1$-C$_{12}$ alkyl, C$_1$-C$_{12}$ alkoxy, C$_6$-C$_{12}$ aryl, or C$_1$-C$_{12}$ acyl; h is 0 to 2, j is 1 or 2, i is an integer of 0 or 1, and k is an integer of 0 to 3, with the proviso that at least two of R$^r$, R$^p$, R$^q$ and R$^t$ taken together are a fused cycloaliphatic, aromatic, or heteroaromatic ring. It will be understood that where the fused ring is aromatic, the ring as shown in formula (v) will have an unsaturated carbon-carbon linkage where the ring is fused. When i is 0, h is 0, and k is 1, the ring as shown in formula (v) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., R$^q$ and R$^t$ taken together) form an aromatic group, and in another embodiment, R$^q$ and R$^t$ taken together form one aromatic group and R$^r$ and R$^p$ taken together form a second aromatic group. When R$^q$ and R$^t$ taken together form an aromatic group, R$^p$ can be a double-bonded oxygen atom, i.e., a ketone.

Other useful dihydroxy monomer units include aromatic dihydroxy compounds of formula (vi)

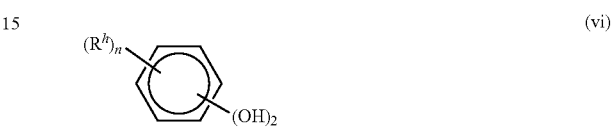

(vi)

wherein each R$^h$ is independently a halogen atom, a C$_1$-C$_{10}$ hydrocarbyl such as a C$_1$-C$_{10}$ alkyl group, a halogen substituted C$_1$-C$_{10}$ hydrocarbyl such as a halogen-substituted C$_1$-C$_{10}$ alkyl group, and n is 0 to 4. The halogen, when present, is usually bromine.

Bisphenol-type dihydroxy aromatic compounds may include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxy-3-methylphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Examples of the types of bisphenol compounds represented by formula (IIa) may include 1,1-bis(4-hydroxyphenyl)methane, 1,1-bis(4-hydroxyphenyl)ethane, 2,2-bis(4-hydroxyphenyl)propane (also referred to as "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), 9,9-bis(4-hydroxyphenyl)fluorene, and 1,1-bis(4-hydroxy-3-methylphenyl)cyclohexane ("DMBPC"). Combinations comprising at least one of the foregoing dihydroxy aromatic compounds can also be used.

The polycarbonate block may make up about 90 wt % to about 98 wt % of the block copolymer, based on the total weight of the polydiorganosiloxane-polycarbonate block copolymer. For example, the polycarbonate block may make up about 92 wt % to about 98 wt %, about 92 wt % to about 96 wt %, or about 93 wt % to about 95 wt % of the block copolymer, based on the total weight of the polydiorganosiloxane-polycarbonate block copolymer. In embodiments, the polydiorganosiloxane block may make up about 90.0 wt %, about 90.25 wt %, about 90.5 wt %, about 90.75 wt %, about 91.0 wt %, about 91.25 wt %, about 91.5 wt %, about 91.75 wt %, about 92.0 wt %, about 92.25 wt %, about 92.5 wt %, about 92.75 wt %, about 93.0 wt %, about 93.25 wt %, about 93.5 wt %, about 93.75 wt %, about 94.0 wt %, about 94.25 wt %, about 94.5 wt %, about 94.75 wt %, about 95.0 wt %, about 95.25 wt %, about 95.5 wt %, about 95.75 wt %, about 96.0 wt %, about 96.25 wt %, about 96.5 wt %, about 96.75 wt %, about 97.0 wt %, about 97.25 wt %, about 97.5 wt %, about 97.75 wt %, or about 98.0 wt % of the block copolymer, based on the total weight of the polydiorganosiloxane-polycarbonate block copolymer.

The polycarbonate block may be a copolymer comprising repeating units of formula (i) as described above, and other types of polymer units such as polyester units. A specific type of copolymer may be a polyester-polycarbonate. The polyester-polycarbonate block may comprise repeating units of formula (i), as described above, and repeating ester units of formula (vii):

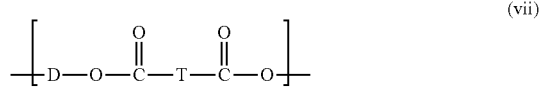

(vii)

wherein O-D-O of formula (vii) is a divalent group derived from a dihydroxy compound, and D may be, for example, one or more alkyl containing $C_6$-$C_{20}$ aromatic group(s), or one or more $C_6$-$C_{20}$ aromatic group(s), a $C_2$-$C_{10}$ alkylene group, a $C_6$-$C_{20}$ alicyclic group, a $C_6$-$C_{20}$ aromatic group or a polyoxyalkylene group in which the alkylene groups contain 2 to about 6 carbon atoms, specifically 2, 3, or 4 carbon atoms. D may be a $C_2$-$C_{30}$ alkylene group having a straight chain, branched chain, or cyclic (including polycyclic) structure. O-D-O may be derived from a monomer of formula (I), as described above. O-D-O may be derived from an aromatic dihydroxy compound of formula (IIa), as described above.

Other examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98.

Overall, D of the repeating units of formula (vii) may be a $C_2$-$C_6$ alkylene group and T may be p-phenylene, m-phenylene, naphthalene, a divalent cycloaliphatic group, or a combination thereof. This class of polyester includes the poly(alkylene terephthalates).

The polyester unit of a polyester-polycarbonate block may be derived from the reaction of a combination of isophthalic and terephthalic diacids (or derivatives thereof) with resorcinol. In another embodiment, the polyester unit of a polyester-polycarbonate may be derived from the reaction of a combination of isophthalic acid and terephthalic acid with bisphenol-A. In an embodiment, the polycarbonate units may be derived from bisphenol-A. In another specific embodiment, the polycarbonate units may be derived from resorcinol and bisphenol-A in a molar ratio of resorcinol carbonate units to bisphenol-A carbonate units of 1:99 to 99:1.

Useful polyesters may include aromatic polyesters, poly(alkylene esters) including poly(alkylene arylates), and poly(cycloalkylene diesters). Aromatic polyesters may have a polyester structure according to formula (vii), wherein D and T are each aromatic groups as described hereinabove. Useful aromatic polyesters may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)] ester, or a combination comprising at least one of these.

The disclosure also provides a process for preparing a polydiorganosiloxane-polycarbonate block copolymer. The process comprises providing a composition that comprises a polydiorganosiloxane monomer, such as a hydroxyaryl end-capped polydiorganosiloxane monomer described herein (e.g., a monomer of formula (Ia)), that has a PDI of less than 2.3 or less than 2.2. The polydiorganosiloxane monomer is then reacted with a dihydroxy monomer unit, such as a compound of formula (IIa), and a carbonate precursor, to form the polydiorganosiloxane-polycarbonate block copolymer.

The block copolymers can be prepared by providing a hydroxyaryl end-capped polydiorganosiloxane monomer, and then synthesizing the polycarbonate blocks from the dihydroxy monomer unit and the carbonate precursor by a process such as interfacial polymerization. Although the reaction conditions for interfacial polymerization can vary, an exemplary process generally involves dissolving or dispersing one or more dihydric phenol reactants, such as a monomer of formula (IIa), in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The most commonly used water immiscible solvents include methylene chloride, 1,2-dichloroethane, chlorobenzene, toluene, and the like. Another exemplary process generally involves using a tube reactor. Such a process may generally involve dissolving or dispersing one or more dihydric phenol reactants, such as a monomer of formula (IIa), in a mixture of water and a water-immiscible solvent. The mixture can be placed in a batch reactor and a carbonate precursor can be added, and the pH can be maintained at a controlled level, e.g., 8 to 10, by addition of a base (such as aqueous sodium hydroxide). After addition of the carbonate precursor, a tubular reactor can be used to add the hydroxyaryl end-capped polydiorganosiloxane compound at a given flow rate, with carbonate precursor and base continuing to flow to the tubular reactor.

Exemplary carbonate precursors may include, for example, a carbonyl halide such as carbonyl bromide or carbonyl chloride, or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, dicarboxylic acid, diacid chloride, or any combination thereof. An interfacial polymerization reaction to form carbonate linkages may use phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4$ NX, $[CH_3(CH_2)_3]_4$PX, $[CH_3(CH_2)_5]_4$NX, $[CH_3(CH_2)_6]_4$ NX, $[CH_3(CH_2)_4]_4$NX, $CH_3[CH_3(CH_2)_3]_3$NX, and $CH_3$ $[CH_3(CH_2)_2]_3$NX, wherein X is Cl$^-$, Br$^-$, a $C_1$-$C_8$ alkoxy group or a $C_6$-$C_{18}$ aryloxy group. An effective amount of a phase transfer catalyst can be 0.1 to 10 wt % based on the weight of bisphenol in the phosgenation mixture. For example, an effective amount of phase transfer catalyst can be 0.5 to 2 wt % based on the weight of bisphenol in the phosgenation mixture.

In embodiments, the use of polydiorganosiloxane monomer having a low PDI (e.g., less than or equal to 2.2, or less than or equal to 2.1, or less than or equal to 2.0) can widen the processing windows available for the preparation of the block copolymers. For example, when using a polydiorganosiloxane monomer having a higher PDI, the optical properties of the resulting block copolymer can depend on process parameters such as phosgenation time. Specifically, a phosgenation time of more than 20 minutes may be necessary to produce a product with an average % haze of less than or equal to 1.5. However, using a low PDI polydiorganosiloxane compound can produce final product having an average % haze of less than or equal to 1.0, where this property is less dependent on parameters such as processing time.

Block copolymers (SiPC2) may be prepared by providing a hydroxyaryl end-capped polydiorganosiloxane monomer, and then synthesizing the polycarbonate blocks from the dihydroxy monomer unit and the carbonate precursor by a process such as interfacial polymerization. Although the reaction conditions for interfacial polymerization may vary, an exemplary process may involve dissolving or dispersing one or more dihydric phenol reactants, such as a monomer of formula (IIa), in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. Water immiscible solvents include methylene chloride, 1,2-dichloroethane, chlorobenzene, and toluene, for example.

All types of polycarbonate end groups are contemplated as being useful in the block copolymers, provided that such end groups do not significantly adversely affect desired properties of the compositions. An end-capping agent (also referred to as a chain-stopper) can be used to limit molecular weight growth rate, and so control molecular weight of the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p-tertiary-butylphenol, cresol, and monoethers of diphenols, such as p-methoxyphenol. Alkyl-substituted phenols with branched chain alkyl substituents having 8 to 9 carbon atoms can be specifically be used.

Polycarbonate blocks with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

The composition may further comprise impact modifiers. For example, the composition can further include impact modifier(s), with the proviso that the additives are selected so as to not significantly adversely affect the desired properties of the composition. Suitable impact modifiers may be high molecular weight elastomeric materials derived from olefins, monovinyl aromatic monomers, acrylic and methacrylic acids and their ester derivatives, as well as conjugated dienes. The polycarbonate composition formed from conjugated dienes can be fully or partially hydrogenated. The elastomeric materials can be in the form of homopolymers or copolymers, including random, block, radial block, graft, and core-shell copolymers. Combinations of impact modifiers may be used.

A specific type of impact modifier may be an elastomer-modified graft copolymer comprising (i) an elastomeric (i.e., rubbery) polymer substrate having a Tg less than or equal to 10° C., less than or equal to 0° C., less than or equal to −10° C., or between about −40° C. to about −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than or equal to 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM);

ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

may be derived from the following monomers:

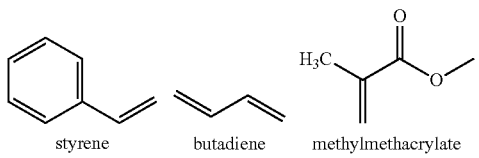

styrene    butadiene    methylmethacrylate

SEBS may be a linear triblockcopolymer based on styrene and ethylene/butylene. Each copolymer chain may consist of three blocks: a middle block that is a random ethylene/butylene copolymer surrounded by two blocks of polystyrene. The SEBS may be styrene-b-(ethylene-co-butylene)-b-styrene polymer.

Impact modifiers may be present in amounts of 1 to 30 parts by weight, based on 100 parts by weight of the composition. Impact modifiers may include MBS and SBS.

The composition may further comprise a UV stabilizer for improved performance in UV stabilization. UV stabilizers disperse UV radiation energy.

UV stabilizers may be hydroxybenzophenones, hydroxyphenyl benzotriazoles, cyanoacrylates, oxanilides, and hydroxyphenyl triazines. UV stabilizers may include, but are not limited to, poly[(6-morpholino-s-triazine-2,4-diyl)[2,2,6,6-tetramethyl-4-piperidyl) imino]-hexamethylene[(2,2,6,6-tetramethyl-4-piperidyl)imino], 2-hydroxy-4-octloxybenzophenoe (Uvinul™ 3008), 6-tert-butyl-2-(5-chloro-2H-benzotriazole-2-yl)-4-methylphenyl (Uvinul™ 3026), 2,4-di-tert-butyl-6-(5-chloro-2H-benzotriazole-2-yl)-phenol (Uvinul™3027), 2-(2H-benzotriazole-2-yl)-4,6-di-tert-pentylphenol (Uvinul™3028), 2-(2H-benzotriazole-2-yl)-4-(1,1,3,3-tetramethylbutyl)-phenol (Uvinul™ 3029), 1,3-bis [(2'cyano-3',3'-diphenylacryloyl)oxy]-2,2-bis-{[(2'-cyano-3',3'-diphenylacryloyl)oxy] methyl}-propane (Uvinul™ 3030), 2-(2H-benzotriazole-2-yl)-4-methylphenol (Uvinul™ 3033), 2-(2H-bezhotriazole-2-yl)-4,6-bis(1-methyl-1-phenyethyl)phenol (Uvinul™ 3034), ethyl-2-cyano-3,3-diphenylacrylate (Uvinul™ 3035), (2-ethylhexyl)-2-cyano-3,3-diphenylacrylate (Uvinul™ 3039), N,N'-bisformyl-N,N'-bis(2,2,6,6-tetramethyl-4-piperidinyl)hexamethylendiamine (Uvinul™ 4050H), bis-(2,2,6,6-tetramethyl-4-pipieridyl)-sebacate (Uvinul™ 4077H), bis-(1,2,2,6,6-pentamethyl-4-piperdiyl)-sebacate+methyl-(1,2,2,6,6-pentamethyl-4-piperidyl)-sebacate (Uvinul™ 4092H) or a combination thereof.

The composition may comprise one or more UV stabilizers, including Cyasorb 5411, Cyasorb UV-3638, Uvinul 3030, and/or Tinuvin 234.

Certain monophenolic UV absorbers, which can also be used as capping agents, can be utilized as one or more additives; for example, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

The composition may further comprise colorants such as pigment and/or dye additives may be present in the composition. Useful pigments may include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly $(C_{2-8})$ olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the composition.

The composition may further comprise flame retardants. Various types of flame retardants can also be utilized as additives. In one embodiment, the flame retardant additives include, for example, flame retardant salts such as alkali metal salts of perfluorinated $C_{1-16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the polycarbonate compositions disclosed herein.

In another embodiment, the flame-retardants are selected from at least one of the following: alkali metal salts of perfluorinated $C_{1-16}$ alkyl sulfonates; potassium perfluorobutane sulfonate; potassium perfluoroctane sulfonate; tetraethylammonium perfluorohexane sulfonate; and potassium diphenylsulfone sulfonate.

In another embodiment, the flame retardant is not a bromine or chlorine containing composition.

In another embodiment, the flame retardant additives include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful as additives, for example, compounds of the formulas below:

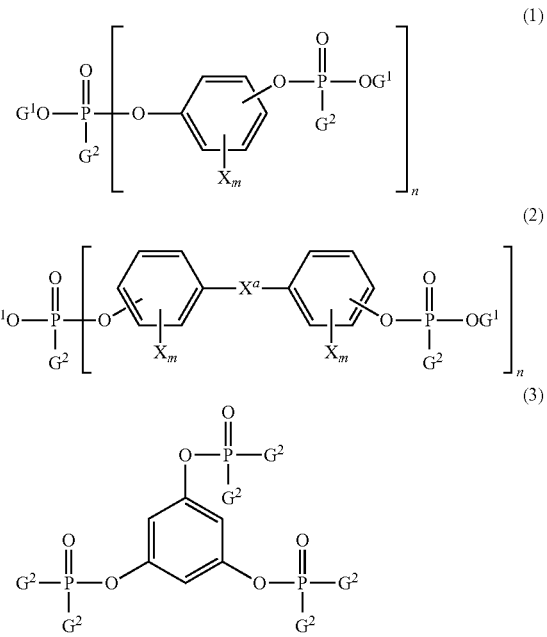

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, and tris(aziridinyl) phosphine oxide.

The flame retardant additive may have formula (4):

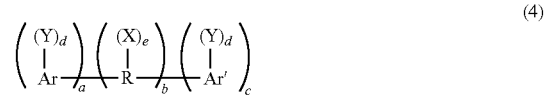

wherein R is a $C_{1-36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

The Ar and Ar' in formula (4) are each independently mono- or polycarbocyclic aromatic groups such as phenylene, biphenylene, terphenylene, naphthylene, or the like.

Y is an organic, inorganic, or organometallic radical, for example halogen, e.g., chlorine, bromine, iodine, fluorine; ether groups of the general formula OB, wherein B is a monovalent hydrocarbon group similar to X; monovalent hydrocarbon groups of the type represented by R; or other substituents, e.g., nitro, cyano, and the like, said substituents being essentially inert provided that there is greater than or equal to one, specifically greater than or equal to two, halogen atoms per aryl nucleus. One or both of Ar and Ar' may further have one or more hydroxyl substituents.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; an aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of polymeric or oligomeric flame retardants derived from mono or dihydroxy derivatives of formula (4) are: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl) ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane; and 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula $(R_2SiO)y$ wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

When present, the foregoing flame retardant additives are generally present in amounts of 0.01 to 10 wt %, more specifically 0.02 to 5 wt %, based on 100 parts by weight of the composition.

In addition to the flame retardant, for example, the herein described polycarbonates can include various additives ordinarily incorporated in polycarbonate compositions, with the proviso that the additives are selected so as to not significantly adversely affect the desired properties of the polycarbonate. Combinations of additives can be used. Such additives can be mixed at a suitable time during the mixing of the components for forming the polycarbonate.

The composition may further comprise heat stabilizers. Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 part by weight, based on 100 parts by weight of the composition.

The composition may further comprise plasticizers, lubricants, mold release agents. Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the composition.

The composition may further comprise other fillers or reinforcing agents. Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (atmospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the composition.

The composition may further comprise an antioxidant additive. Exemplary antioxidant additives include, for example, organophosphites such as tris(nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 part by weight, based on 100 parts by weight of the composition.

The composition may further comprise an antistatic agent. Examples of monomeric antistatic agents may include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents may include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT™ 6321 (Sanyo) or PEBAX™ MH1657 (Atofina), IRGASTAT™ P18 and P22 (Ciba-Geigy). Other polymeric materials may be used as antistatic agents are inherently conducting polymers such as polyaniline (commercially available as PANIPOL™EB from Panipol), polypyrrole and polythiophene (commercially available from Bayer), which retain some of their intrinsic conductivity after melt processing at elevated temperatures. Carbon fibers, carbon nanofibers, carbon nanotubes, carbon black, or a combination comprising at least one of the foregoing may be used in a polymeric resin containing chemical antistatic agents to render the composition electrostatically dissipative. Antistatic agents are generally used in amounts of 0.0001 to 5 parts by weight, based on 100 parts by weight of the composition.

The composition may further comprise blowing agent. Foam may be a useful blowing agent. Low boiling halohydrocarbons and those that generate carbon dioxide may be used as blowing agents. Blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents. Blowing agents may be used in amounts of 0.01 to 20 parts by weight, based on 100 parts by weight of the composition.

The composition may further comprise anti-drip agents. The anti-drip agent may be a fibril forming or non-fibril forming fluoropolymer such as polytetrafluoroethylene (PTFE). The anti-drip agent can be encapsulated by a rigid copolymer as described above, for example styrene—acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt. % PTFE and 50 wt.

% SAN, based on the total weight of the encapsulated fluoropolymer. The SAN can comprise, for example, 75 wt. % styrene and 25 wt. % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 percent by weight, based on 100 parts by weight of the composition.

The composition may further comprise radiation stabilizers. The radiation stabilizer may be a gamma-radiation stabilizer. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($-CH_2OH$) or it can be a member of a more complex hydrocarbon group such as $-CR^4HOH$ or $-CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 parts by weight based on 100 parts by weight of the composition.

A blend comprising the SiPC2 block copolymer may have a formulation as shown in Table 1. PC105 is a phenol endcapped PC with Mw of about 30,000. PC175 is a PCP endcapped PC with Mw of about 22,000. Ref is SiPC2 with a PDI of 2.3. Low PDI 1 is SiPC2 with a PDI of 1.8 (% Si=20). Low PDI 2 is SiPC2 with a PDI of 1.8 (% Si=20).

TABLE 1

| Item Description | Unit | Ref | Blend 1 | Blend 2 |
| --- | --- | --- | --- | --- |
| PC105 | % | 38.01 | 38.01 | 38.01 |
| PC175 | % | 38.01 | 38.01 | 38.01 |
| Ref | % | 22.20 | | |
| Low PDI 1 | % | | 22.20 | |
| Low PDI 2 | % | | | 22.20 |
| FR additive | % | 0.30 | 0.30 | 0.30 |
| Anti dripping agent | % | 0.30 | 0.30 | 0.30 |
| Release agent | % | 0.30 | 0.30 | 0.30 |
| UV stabilizer | % | 0.30 | 0.30 | 0.30 |
| Heat stabilizer | % | 0.09 | 0.09 | 0.09 |
| Carbon black | % | 0.50 | 0.50 | 0.50 |
| Formulation Total | % | 100.00 | 100.00 | 100.00 |

The polydiorganosiloxane-polycarbonate block copolymers disclosed herein may have a number of desirable optical properties, including % haze and % transmission. For example, the polydiorganosiloxane-polycarbonate block copolymers produced using the methods disclosed herein may provide block copolymers having consistent optical properties, whereas corresponding block copolymers made using other procedures may not. The optical properties of block copolymers can vary widely depending on the source of the hydroxyaryl end-capped polydiorganosiloxane monomer starting materials, and can even vary when using different lots of the same material. Using analytical methods described herein, it has been found that using hydroxyaryl end-capped polydiorganosiloxane monomer starting materials with narrow polydispersities (e.g., a PDI of less than 2.3 or less than 2.2) can allow for the production of polydiorganosiloxane-polycarbonate block copolymers that have more consistent properties and in particular may include desirable % haze and % transmission.

For example, a polydiorganosiloxane-polycarbonate block copolymer described herein, such as one produced by a method described herein, may be used to prepare a molded article such as a plaque and the % haze value can be determined according to ASTM D 1003-07. A molded article of 3.15 mm thickness may have a % haze of less than or equal to 1.5, e.g., less than or equal to 1.0. In embodiments, a molded article of 3.15 mm thickness may have a % haze of about 1.50, about 1.45, about 1.40, about 1.35, about 1.30, about 1.25, about 1.20, about 1.15, about 1.10, about 1.05, about 1.00, about 0.95, about 0.90, about 0.85, about 0.80, about 0.75, about 0.70, about 0.65, about 0.60, about 0.55, about 0.50, about 0.45, about 0.40, about 0.35, about 0.30, about 0.25, about 0.20, about 0.15, about 0.10, or about 0.05.

A molded article of 3.15 mm thickness may have a Db value of less than or equal to 4.5, e.g., less than or equal to 4.0, less than or equal to 3.0 or less than or equal to 2.0. In embodiments, a molded article of 3.15 mm thickness may have a Db value of less than or equal to 4.5, less than or equal to 4.4, less than or equal to 4.3, less than or equal to 4.2, less than or equal to 4.1, less than or equal to 4.0, less than or equal to 3.9, less than or equal to 3.8, less than or equal to 3.7, less than or equal to 3.6, less than or equal to 3.5, less than or equal to 3.4, less than or equal to 3.3, less than or equal to 3.2, less than or equal to 3.1, less than or equal to 3.0, less than or equal to 2.9, less than or equal to 2.8, less than or equal to 2.7, less than or equal to 2.6, less than or equal to 2.5, less than or equal to 2.4, less than or equal to 2.3, less than or equal to 2.2, less than or equal to 2.1, less than or equal to 2.0, less than or equal to 1.9, less than or equal to 1.8, less than or equal to 1.7, less than or equal to 1.6, less than or equal to 1.5, less than or equal to 1.4, less than or equal to 1.3, less than or equal to 1.2, or less than or equal to 1.0.

The block copolymers may have a weight average molecular weight of about 10,000 to about 100,000. For example, the block copolymers may have a weight average molecular weight of about 30,000 to about 50,000. In some embodiments, the block copolymers may have a weight average molecular weight of about 10,000 g/mol, about 15,000 g/mol, about 20,000 g/mol, about 25,000 g/mol, about 30,000 g/mol, about 35,000 g/mol, about 40,000 g/mol, about 45,000 g/mol, about 50,000 g/mol, about 55,000 g/mol, about 60,000 g/mol, about 65,000 g/mol, about 70,000 g/mol, about 75,000 g/mol, about 80,000 g/mol, about 85,000 g/mol, about 90,000 g/mol, about 95,000 g/mol, or about 100,000 g/mol. (All values may be considered as ±1,000 g/mol.)

The disclosure also provides an analytical method for evaluating a chemical composition distribution of a hydroxyaryl end-capped polydiorganosiloxane monomer composition, and may be particularly useful for evaluating hydroxyaryl end-capped polydialkylsiloxane monomer compositions. The methods include providing a composition comprising hydroxyaryl end-capped polydiorganosiloxane monomers of formula (Ia) described herein. The polymers are evaluated by performing size exclusion chromatography (SEC) and detecting at least one of the refractive index (RI) and ultraviolet absorbance (UV) signals of the monomers at a retention time. In some embodiments, both the RI and the UV signals of the monomers are detected at a retention time. At least one or both of the RI and UV signals from the monomers are then analyzed using an indirect classical least squares (ICLS) analysis. The ICLS analysis can determine at least one of a concentration of polydiorganosiloxane units and a concentration of hydroxyaryl end-capping groups, or both of a concentration of polydiorganosiloxane units and a concentration of hydroxyaryl end-capping groups. The above described process can thereby obtain the chemical composition distribution of at least one of the polydiorganosiloxane units and hydroxyaryl end capping groups in the composition based on at least one of the RI and UV signals at one or more retention times or at each retention time. In another embodiment, the process can obtain the chemical composition distribution of both the polydiorganosiloxane units and the hydroxyaryl end capping groups in the composition based on at least one of the RI and UV signals at one or more retention times or at each retention time. In another embodiment, the process can obtain the chemical composition distribution of both the polydiorganosiloxane units and the hydroxyaryl end capping groups in the composition based on both of the RI and UV signals at one or more retention times or at each retention time.

Standard SEC techniques and columns can be used, for example, those available from Agilent Technologies, Thermo Fisher Scientific, GE Healthcare Life Sciences, and the like. Suitable columns include Agilent MiniMIX-D columns.

Typical analytical methods for polymers use SEC with various forms of detection. However, in the case of hydroxyaryl end-capped polydialkylsiloxane monomers, the hydroxyaryl end-capping groups are UV active while the polydialkylsiloxane repeating units are not. Additionally, the hydroxyaryl end-capping groups and the polydialkylsiloxane groups give rise to positive and negative refractive index signals, respectively. Finally, the compositions are not constant across the molecular weight distribution. The signals from the hydroxyaryl end-capping groups provide a greater contribution to the overall signal for shorter chains, while the signals from the polydialkylsiloxane groups provide a greater contribution to the overall signal for longer chains. In some circumstances, neither SEC-UV nor SEC-RI can be used alone to directly calculate the concentration distributions.

The UV photodiode array detection is a spectroscopic technique which follows Lambert-Beers Law, meaning that the concentration (C) is linear with the measured absorbance (A) at a certain path length (L).

$$A_{\lambda,1} = K_{\lambda,1} * L * C \qquad (1)$$

With UV detection only UV-active components can be detected, for example, hydroxyaryl end-capping groups. By combining the UV and RI signals followed by a multivariate data analysis by ICLS, it is possible to separately calculate the concentration of the polydialkylsiloxane and the hydroxyaryl end-capping groups at a certain retention time. The technique estimates the pure component signals of the hydroxyaryl end-capping group and the polydialkylsiloxane using a set of hydroxyaryl end-capped polydialkylsiloxane samples of different known lengths as calibration set.

The measured UV and RI signals (R) are correlated to the concentration matrix (C), calculated from the calibration set, according to equation (2):

$$R = C * S \qquad (2)$$

where S is the response factor matrix of eugenol and PDMS for both UV and RI. Given the known R and C matrices, it is possible to estimate the response factor matrix S using equation (3):

$$(C^T C)^{-1} C^T R = S \qquad (3)$$

For the R matrix, the sum of the measured UV and RI signals, only the range of the chromatogram that only includes the polymer peaks is considered. The calculated R matrix is related to the concentration of eugenol and PDMS in the injected solution, for example. After proper calibration the concentration of eugenol and PDMS in an unknown sample is predicted for each retention time in the chromatogram using the measured R matrix and the calculated S matrix. Based on the predicted concentration chromatograms for eugenol and PDMS, the molecular weight distribution, CCD, the percent of eugenol and percent of PDMS of the sample can be calculated, using the equations shown in Scheme 1 below. These are exemplary equations for analysis of eugenol end-capped polydimethylsiloxane; $M_w$=weight average molecular weight; $M_n$=number average molecular weight; M=polystyrene molecular weight at a given retention time; $CCD_{PDMS}$=chemical composition distribution for polydimethylsiloxane; $CCD_{Eug}$=chemical composition distribution for eugenol.

Scheme 1. Calculations used in the *SEC-UV-RI* method $$M_w = \frac{\sum M * n}{\sum M^2 * n} \qquad CCD_{PDMS} = \frac{[C_{PDMS}]}{[C_{PDMS}] + [C_{Eug}]}$$

$$M_n = \frac{\sum M * n}{\sum n} \qquad CCD_{Eug} = \frac{[C_{eug}]}{[C_{PDMS}] + [C_{Eug}]}$$

$$\% \, PDMS = \frac{\sum_{T=m}^{T=n} [C_{PDMS}]}{\sum_{T=m}^{T=n} [C_{PDMS}] + [C_{Eug}]}$$

$$\% \, Eug = \frac{\sum_{T=m}^{T=n} [C_{Eug}]}{\sum_{T=m}^{T=n} [C_{PDMS}] + [C_{Eug}]}$$

Indirect classical least squares calculation can be used using known software programs, such as, for example, MATLAB. Exemplary calculations will be illustrated in the Examples.

The analytical method disclosed herein could additionally be used for characterization of co-polymers and polymer blends where one of the two components is not UV-active.

A block copolymer, such as described above, may be formed, shaped, molded or injection molded into an article. The article may be produced by a manufacturing process. The process may comprise the steps of (a) providing a composition comprising one or more block copolymers described above. The composition from step (a) may then be (b) melted, for example, at 200-400° C. in an extruder. The melted composition of step (b) may then be (c) extruded, and (d) the composition may be isolated or chopped. The article of manufacture may further be produced by the step of (e) drying the composition. The block copolymers can be molded into useful shaped articles by a variety of means such as injection molding, extrusion, rotational molding, blow molding and thermoforming to form articles. In some embodiments, the article may be a molded article, such as a molded plaque. The article may have at least one dimension of at least about 1 mm, at least about 1.5 mm, at least about 2.0 mm, at least about 2.5 mm, at least about 3.0 mm, at least about 3.5 mm, at least about 4.0 mm, at least about 4.5 mm, or at least about 5.0 mm. The article may have at least one dimension of 3.15 mm.

Other articles include, for example, various components for cell phones and cell phone covers, components for computer housings, computer housings and business machine housings such as housings for monitors, handheld electronic device housings such as computer or business machine housings, housings for hand-held devices, components for light fixtures or home appliances, components for medical applications or devices, components for interior or exterior components of an automobile, lenses (auto and non-auto) such as components for film applications, greenhouse components, sun room components, or fire helmets, and the like.

In certain embodiments, an article comprising a block copolymer, as described above, may be selected from automotive bumpers, other automotive exterior components, automobile mirror housings, automobile wheel covers, automobile instrument panels and trim, automobile glove boxes, automobile door hardware and other interior trim, automobile exterior lights, automobile parts within the engine compartment, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, lighting parts, dental instruments, medical instruments, cookware, medical instrument trays, animal cages, fibers, laser welded medical devices, and fiber optics.

The present invention has multiple aspects, illustrated by the following non-limiting examples.

EXAMPLES

Example 1

Calibration of Eugenol End-Capped Polydimethylsiloxanes

This analysis used an Agilent 1200 LC instrument with Chemistation chromatography software (obtained from Agilent). Detector 1 was a ultraviolet-diode array (UV-DAD) detector set to detect at 254 nm. Detector 2 was a refractive index (RI) detector. The injection volume was 10 microliters (μL), and the solvent was dichloromethane at a flow rate of 0.3 milliliters per minute (mL/min). The instrument was equipped with two MiniMIX-D columns (obtained from Agilent), each with a molecular weight range of 2000000-200 g/mol. Calibration and prediction software was MATLAB R2006b (obtained from MathWorks™). The chromatograms were first aligned by setting the flow marker (toluene) peak at the retention time of 10.2 minutes.

Molecular weight calibration was conducted using a set of twelve monodisperse polystyrene (PS) standards, as shown in Table 2. Each standard was at a concentration of 100 ppm in dichloromethane. Mp=molecular weight at peak top. Rt=retention time. Afterward, a second order calibration was performed by plotting the Retention time of each peak top at 254 nm, against the log of the molecular weight for each standard.

TABLE 2

Polystyrene Calibration Standards

| Standard | Rt (min) | Log Mp | Mp |
|---|---|---|---|
| PS cal-1 | 5.537667 | 5.995854 | 990500 |
| PS cal-2 | 5.911333 | 5.692406 | 492500 |
| PS cal-3 | 6.224667 | 5.410609 | 257400 |
| PS cal-4 | 6.558 | 5.123525 | 132900 |
| PS cal-5 | 6.885 | 4.850952 | 70950 |
| PS cal-6 | 7.178333 | 4.580925 | 38100 |
| PS cal-7 | 7.505333 | 4.295787 | 19760 |
| PS cal-8 | 7.832333 | 4.004751 | 10110 |
| PS cal-9 | 8.172333 | 3.691081 | 4910 |
| PS cal-10 | 8.439 | 3.462398 | 2900 |
| PS cal-11 | 8.852667 | 3.079181 | 1200 |
| PS cal-12 | 9.159333 | 2.763428 | 580 |

Following the above calibration, an indirect classical least squares calibration was performed using a set of four calibration samples of eugenol end-capped polydimethylsiloxane (EC-PDMS) of varying molecular weights, as shown in Table 3. The samples were dissolved in dichloromethane (1200-1300 ppm). For each calibration sample the UV-signal at 254 nm and RI-signal was measured and correlated to the eugenol and PDMS concentrations.

TABLE 3

EC-PDMS Standards used for SEC-UV-RI method

| Standard | ppm eugenol | ppm PDMS |
|---|---|---|
| 1 (D10) | 415.8 | 891.7 |
| 2 (D20) | 248.6 | 1066.0 |
| 3 (D30) | 182.5 | 1173.5 |
| 4 (D50) | 113.2 | 1213.0 |

The eugenol and PDMS concentrations were predicted for each retention time in the chromatogram by using the ICLS calibration results. The calculations are carried out by a MATLAB macro which loaded the raw data files containing the UV and RI signals, synchronized the RI and UV data and automatically calculated the eugenol and PDMS concentration distributions. Based on the calculated concentration distributions, the molecular weight distribution MwD for both eugenol and PDMS were calculated using the polystyrene calibration and the concentration distribution.

Example 2

SiPC1 Synthesis

To the formulation tank was added dichloromethane (8 liters (L)), DI water (9 L), bisphenol-A (4000 grams (g), 17.5 moles), p-cumylphenol (160 g, 0.75 mole), triethylamine (30 g, 0.30 mole) and sodium gluconate (10 g). The mixture was transferred to the batch reactor. The formulation tank was rinsed with dichloromethane (3 L) which was transferred to the batch reactor. The reactor agitator was started and circulation flow was set at 80 L/min. Phosgene flow to the reactor was initiated (segment 1: 230 g, 80 g/min rate). A pH target of 10.0 was maintained throughout the batch by the DCS controlled addition of 33% aqueous sodium hydroxide. After 230 g phosgene addition to the batch reactor the tubular reactor initiated to add eugenol-end capped D-45 chloroformate to the batch reactor (312 g, 0.08 mole, 20 wt % solution in dichloromethane chilled to 10° C.). The D45 solution flow rate to the tubular reactor was 500 g/min (3.1 min addition cycle) with phosgene addition to the tubular reactor at 28 g/min (5 mol phosgene/mol D45 OH group) and 18% aqueous sodium hydroxide flow to the tubular reactor at 316 g/min (5 mol NaOH/mol phosgene, chilled to 4° C.). After completion of siloxane addition via the tubular reactor, the tubular reactor was flushed with dichloromethane (2 L) and DI water (2 L) to the batch reactor. Phosgene flow continued to the batch reactor during the tubular reactor cycle (segment 2: 2070 g, 80 g/min rate). The total phosgene addition time to the batch reactor was 29 minutes. After completion of the phosgene addition, a sample of the reactor was obtained and verified to be free of un-reacted BPA and free of chloroformate. Mw of the reaction sample was determined by gel permeation chromatography (GPC). The reactor was purged with nitrogen then the batch was transferred to the centrifuge feed tank.

To the batch in the feed tank was added dilution dichloromethane (8 L) then the mixture was purified using a train of liquid—liquid centrifuges. Centrifuge one removed the brine phase. Centrifuge two removed the catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped dryer using heated nitrogen (130° C.).

Example 3

SiPC2 Synthesis

To the formulation tank was added dichloromethane (15 L), DI water (10 L), bisphenol-A (3,700 g, 16.2 moles), D45 eugenol siloxane (1150 g, 0.30 mole), triethylamine (30 g, 0.30 mole, 1.7 mole %) and sodium gluconate (10 g, iron scavenger). The mixture was stirred then transferred to the batch reactor. The formulation tank was rinsed with dichloromethane (5 L) which was transferred to the batch reactor. The reactor agitator was started and the circulation flow was set at 80 L/min. Phosgene vapor flow to the reactor was initiated by the DCS (segment 1:215 g, 80 g/min). The pH of the reaction was maintained at a target of 10.0 by DCS controlled addition of 33% aqueous NaOH. After addition of 215 g of phosgene a solution of para cumyl phenol (116 g, 0.55 mole) in dichloromethane was added to the reactor by DCS control while phosgene flow to the reactor continued. Phosgene addition continued until the total set point was reached (2150 g, 21.7 moles). After completion of the phosgene addition, a sample of the reactor was obtained and verified to be free of un-reacted BPA and free of chloroformate. Mw of a reaction sample was determined by GPC (Mw=30278, PDI=2.7). An additional charge of phosgene was added (200 g, 2.0 mole) to the reactor. The reactor was purged with nitrogen then the batch was transferred to the centrifuge feed tank.

Example 4

Analysis of EC-PDMS Samples and Block Copolymers

Based on the calculated concentration distributions, eugenol and PDMS composition across the molecular weight distribution was predicted and compared for a series of EC-PDMS samples. Different samples of EC-PDMS, with an average D-block length of 45, were obtained from different suppliers and analyzed. Since the relative amount of PDMS has the highest contribution to long and medium size chains, the PDMS concentration distribution was used to quantify the high and medium molecular weight fractions. On the contrary, eugenol concentration distribution was used to quantify the low molecular weight fraction due to its higher relative amount in short size chains.

The chromatograms of eugenol-end-capped polydimethylsiloxanes obtained by SEC-UV-RI were first aligned by setting the flow marker (toluene) peak at the retention time of 10.2 minutes. The area % related to the Low and High Mw region of the chromatogram were calculated by peak area integration between the following retention time. Each chromatogram was divided in three main regions: 1) High MwD 6.9-7.8 min (where 7.8 min corresponds to about 22,000 g/mol based on the PS standards), 2) Medium MwD 7.8-8.8 min (where 8.8 min corresponds to about 3,000 g/mol based on the PS standards), and 3) Low MwD 8.8-9.4 min. Then the area of each region was calculated and compared for all samples. The area under the full curve was calculated from 6.9 to 9.4 min (where 6.9 min corresponds to 125,000 g/mol based on the polystyrene standards and 9.4 min corresponds to 800 g/mol based on the polystyrene standards). The area under the curve for each of the different fractions above was divided by the total area under the chromatogram, and the area % was obtained by multiplying the result by 100. The PDI, % low molecular weight fraction and % high molecular weight fraction for the EC-PDMS samples are presented in the indicated columns in Table 4.

Each of the EC-PDMS samples was then used to prepare a block copolymer as set forth in Example 2. The block copolymers were then used to prepare 3.15 mm plaques by molding at 300° C. The molding machine was first cleaned with standard PC (Mw of ca. 30,000 g/mol). Using the molded plaques, Db values and haze values were determined. Db values were obtained using a Macbeth COLOR-EYE™ 7000 A reference spectrophotometer, using reference values for L* of 95.957, a* of −0.015, and b* of 0.42. The average % haze values were determined according to ASTM D 1003-07, measured on Haze-Gard plus instrument (BYK-Gardner GmbH). Data are summarized in the indicated columns in Table 4.

TABLE 4

Molecular weight distribution of selected samples of EC-PDMS analyzed via SEC-UV-RI, and characterization data for PDMS-PC plaques

| Material | PDI | Eugenol % Low Mw 8.8-9.4 min | Siloxane % High-Mw 6.9-7.8 min | Db | Haze |
|---|---|---|---|---|---|
| ex_PCDMS_1 | 1.70 | 4.93 | 22.51 | 2.51 | 0.94 |
| ex_PCDMS_2 | 1.70 | 4.61 | 23.89 | 2.30 | 0.93 |
| ex_PCDMS_3 | 1.78 | 5.85 | 21.91 | 2.36 | 0.88 |
| ex_PCDMS_4 | 1.79 | 6.14 | 23.60 | 2.73 | 0.88 |
| ex_PCDMS_5 | 1.82 | 6.10 | 24.10 | 2.65 | 0.80 |
| ex_PCDMS_6 | 1.82 | 6.10 | 24.10 | 2.65 | 0.80 |
| ex_PCDMS_7 | 1.84 | 7.03 | 22.01 | 2.73 | 0.88 |
| ex_PCDMS_8 | 2.06 | 12.39 | 26.20 | 4.15 | 1.41 |
| ex_PCDMS_9 | 2.10 | 13.10 | 24.20 | 4.15 | 1.41 |
| ex_PCDMS_10 | 2.18 | 13.88 | 24.99 | 4.06 | 1.45 |
| cex_PCDMS_11 | 2.22 | 15.20 | 28.20 | 5.46 | 2.19 |
| cex_PCDMS_12 | 2.24 | 14.60 | 29.50 | 5.40 | 2.18 |
| cex_PCDMS_13 | 2.38 | 15.10 | 30.50 | 5.40 | 2.25 |
| cex_PCDMS_14 | 2.39 | 16.91 | 27.23 | 4.79 | 1.75 |
| cex_PCDMS_15 | 2.36 | 16.14 | 28.59 | 5.43 | 2.31 |
| cex_PCDMS_16 | 2.38 | 16.14 | 28.59 | 5.43 | 2.31 |
| cex_PCDMS_17 | 2.39 | 16.84 | 27.92 | 5.14 | 1.92 |

*The PDI values of Table 4 were calculated from the eugenol distributions.

The following observations can be made. First, the higher the high PDMS molecular weight fraction, the higher the haze of the final co-polycarbonate. Second, the lower the low eugenol molecular weight fraction, the lower the haze of the final co-polycarbonate. Third, there appears to be an upper limit for both eugenol and PDMS molecular weight fractions above which haze increases substantially.

Figure 2:
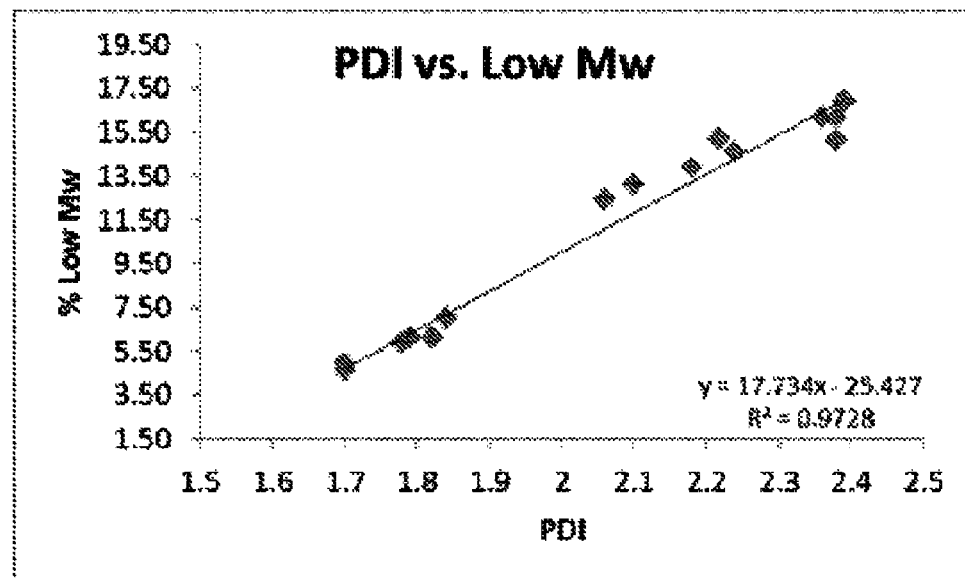
FIG. 2 shows graphs of: a) the % low molecular weight fraction of the eugenol end-capped polydimethylsiloxane starting material determined using an SEC-UV-RI method described herein, vs. the PDI of the same eugenol end-capped polydimethylsiloxane starting material; and b) the % high molecular weight fraction of the eugenol end-capped polydimethylsiloxane starting material determined using an SEC-UV-RI method described herein, vs. the PDI of the same eugenol end-capped polydimethylsiloxane starting material.
Figure 2:
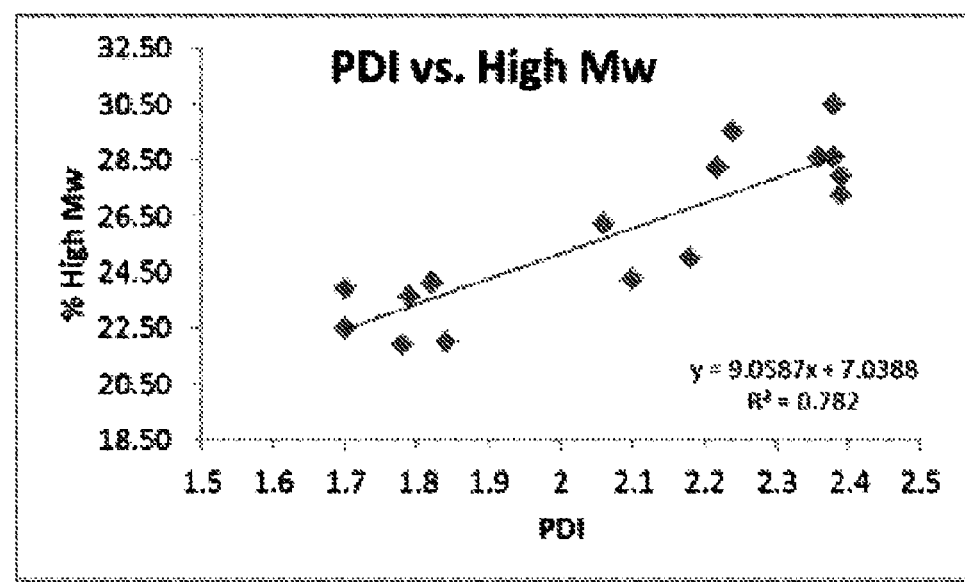
Figure 3:
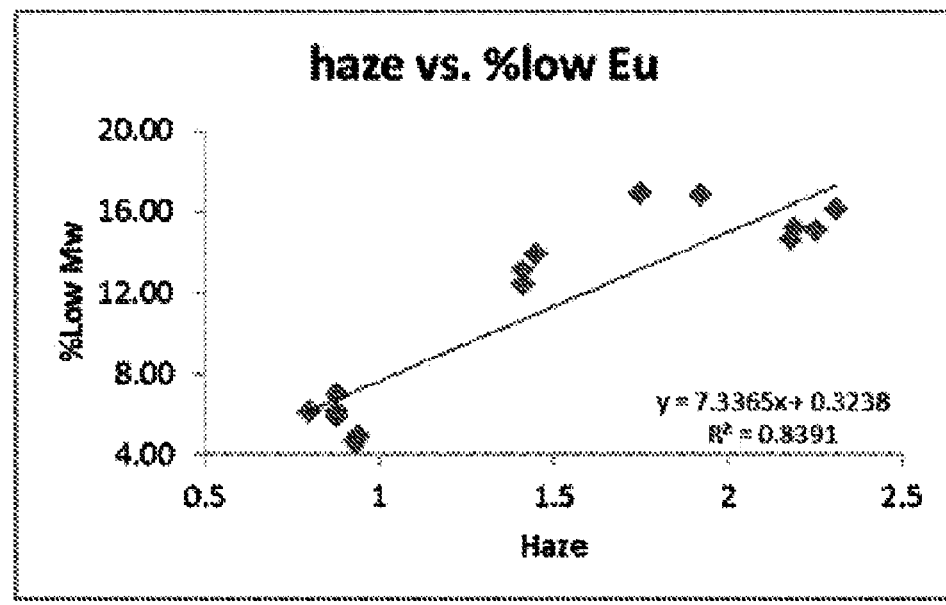
FIG. 3 shows graphs of: a) the % low molecular weight fraction of the eugenol end-capped polydimethylsiloxane starting material determined using an SEC-UV-RI method described herein, vs. the measured % haze values for a 3.15 mm molded plaque prepared from a polydimethylsiloxane-polycarbonate block copolymer, that was prepared from the eugenol end-capped polydimethylsiloxane starting material; and b) the % high molecular weight fraction of the eugenol end-capped polydimethylsiloxane starting material determined using an SEC-UV-RI method described herein, vs. the measured % haze values for a 3.15 mm molded plaque prepared from a polydimethylsiloxane-polycarbonate block copolymer, that was prepared from the eugenol end-capped polydimethylsiloxane starting material.
Figure 3:
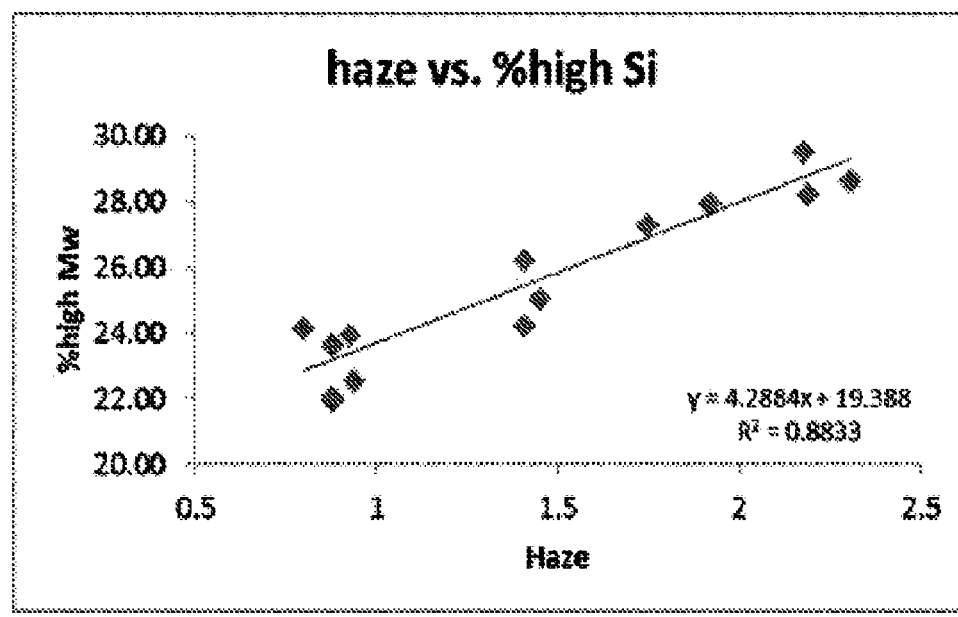
Figure 4:
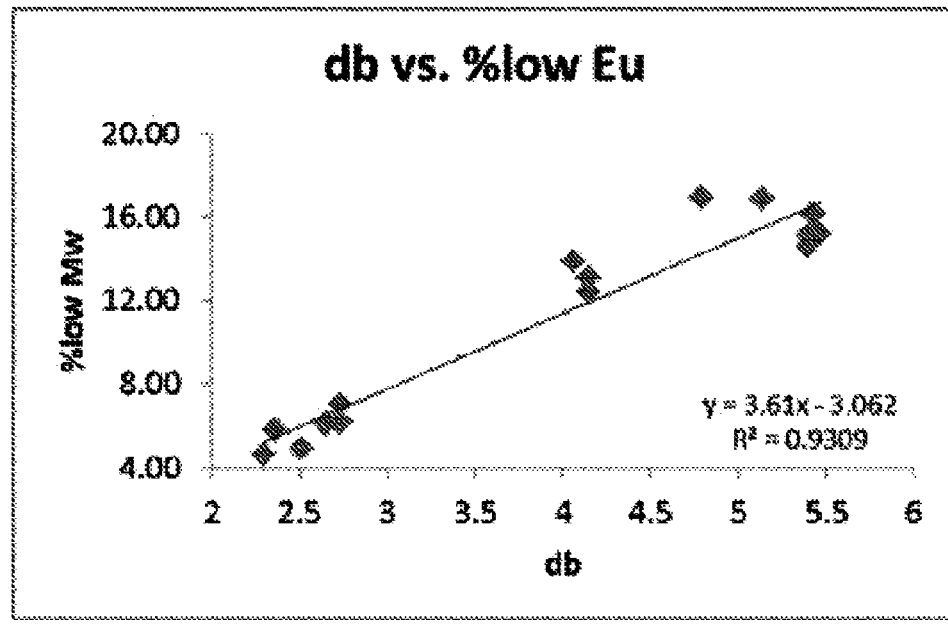
FIG. 4 shows graphs of: a) the % low molecular weight fraction of the eugenol end-capped polydimethylsiloxane starting material determined using an SEC-UV-RI method described herein, vs. the measured Db values for a 3.15 mm molded plaque prepared from a polydimethylsiloxane-polycarbonate block copolymer, that was prepared from the eugenol end-capped polydimethylsiloxane starting material; and b) the % high molecular weight fraction of the eugenol end-capped polydimethylsiloxane starting material determined using an SEC-UV-RI method described herein, vs. the measured Db values for a 3.15 mm molded plaque prepared from a polydimethylsiloxane-polycarbonate block copolymer, that was prepared from the eugenol end-capped polydimethylsiloxane starting material.
Figure 4:
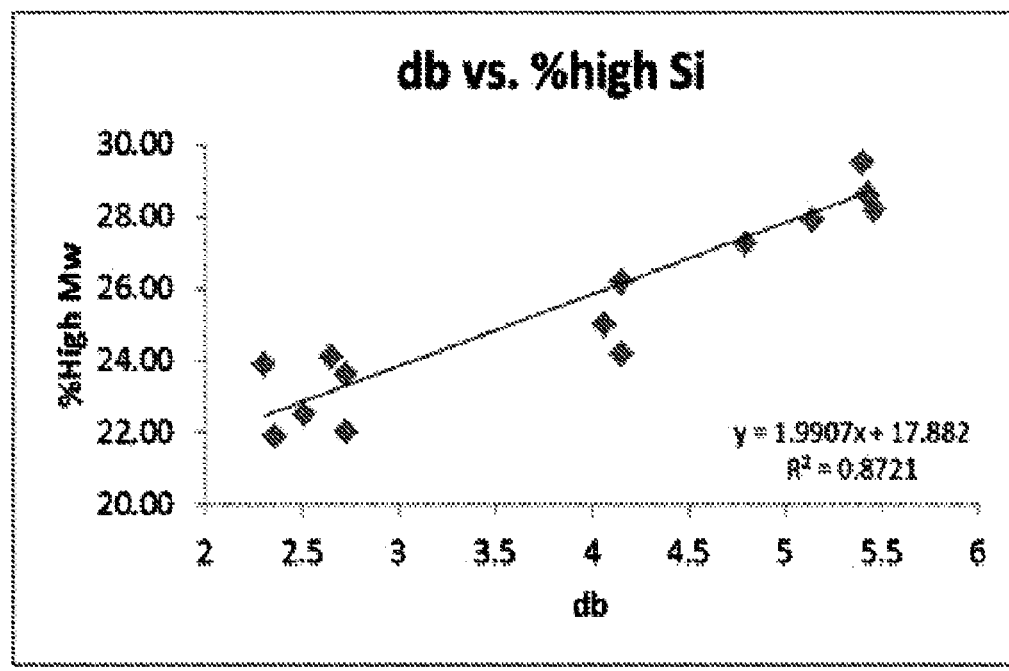

Graphical representations of data from Table 4 are presented in FIGS. 1-4. For example, FIG. 1 shows: a) % haze vs. Db values; b) Db values vs. PDI; and c) % haze vs. PDI. FIG. 2 shows: a) % low molecular weight fraction vs. PDI; and b) % high molecular weight fraction vs. PDI. FIG. 3 shows: a) % low molecular weight fraction vs. % haze; and b) % high molecular weight fraction vs. % haze. FIG. 4 shows: a) % low molecular weight fraction vs. Db values; and b) % high molecular weight fraction vs. Db values.

Example 5

Multi-Point Regression Data

A multi-point regression analysis was performed using Minitab software, to predict both % haze and Db values. The predicted values were then compared to the experimental values.

For the % haze, the regression equation is as follows:

$$haze = -2.39 + 0.0525\,L + 0.127\,H\text{—}Si$$

| Predictor | Coef | SE Coef | T | P |
|---|---|---|---|---|
| Constant | −2.3861 | 0.6028 | −3.96 | 0.001 |
| L | 0.05252 | 0.01664 | 3.16 | 0.007 |
| H-Si | 0.12743 | 0.02921 | 4.36 | 0.001 |
| Mw-Eu | 0.0009256 | 0.0003733 | 2.48 | 0.028 |

The equation parameters (Coef.: −2.39, 0.0525, and 0.127) may change based on variations on the data set (standard deviations). For example, if we assume a ±20% variation on the data, equation parameters may be from 0.0438 to 0.0657 for L, and from 0.106 to 0.159 for H—Si.

Figure 5:
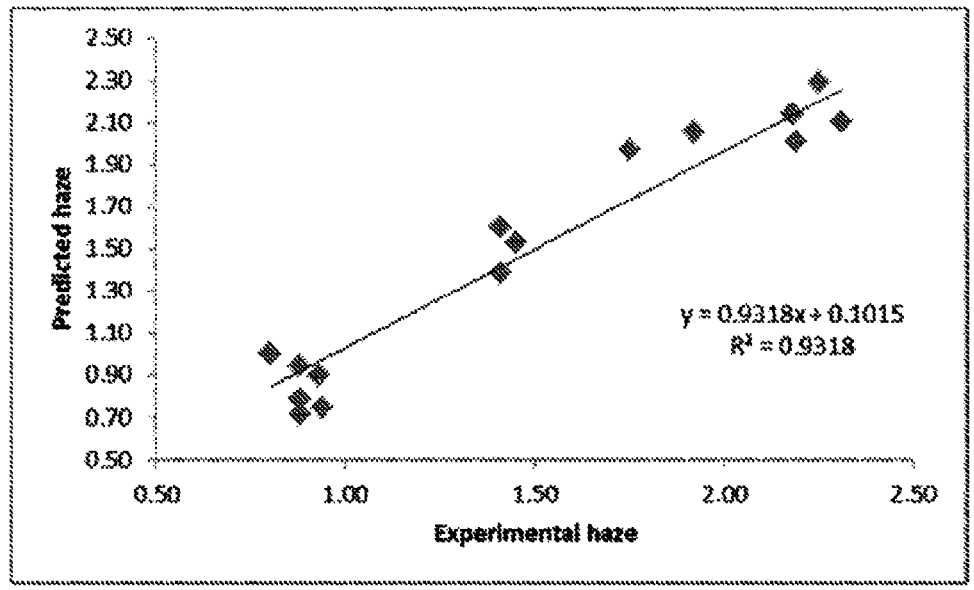
FIG. 5 shows a graph of predicted % haze values vs. experimental % haze values for a molded article prepared from a polydimethylsiloxane-polycarbonate block copolymer.

A graph of predicted haze vs. experimental haze is shown in FIG. 5. Data are shown below in Table 5.

TABLE 5

| Exp | Predicted |
|---|---|
| 0.94 | 0.74 |
| 0.93 | 0.90 |
| 0.88 | 0.71 |
| 0.88 | 0.94 |
| 0.8 | 1.01 |
| 0.8 | 1.01 |
| 0.88 | 0.79 |
| 1.41 | 1.60 |
| 1.41 | 1.39 |
| 1.45 | 1.53 |
| 2.19 | 2.01 |
| 2.18 | 2.14 |
| 2.25 | 2.29 |
| 1.75 | 1.97 |
| 2.31 | 2.10 |
| 2.31 | 2.10 |
| 1.92 | 2.06 | wherein: S=0.16, R-Sq=93.2%, R-Sq(adj)=92.2%, L=% Low Mw, H—Si=% High Mw, and S=standard deviation.

For the Db, the regression equation is as follows:

$$db = -2.83 + 0.165\,Low + 0.191\,H\text{—}Si$$

| Perdictor | Coef | SE Coef | T | P |
|---|---|---|---|---|
| Constant | −2.8251 | 0.7565 | −3.73 | 0.002 |
| L | 0.16495 | 0.02089 | 7.90 | 0.000 |
| H-Si | 0.19143 | 0.03666 | 5.22 | 0.000 |

The equation parameters (Coef.: −2.83, 0.165, and 0.191) may change based on variations on the data set (standard deviations). For example, if we assume a ±20% variation on the data, equation parameters may be from 0.137 to 0.206 for L, and from 0.16 to 0.239 for H—Si.

Figure 6:
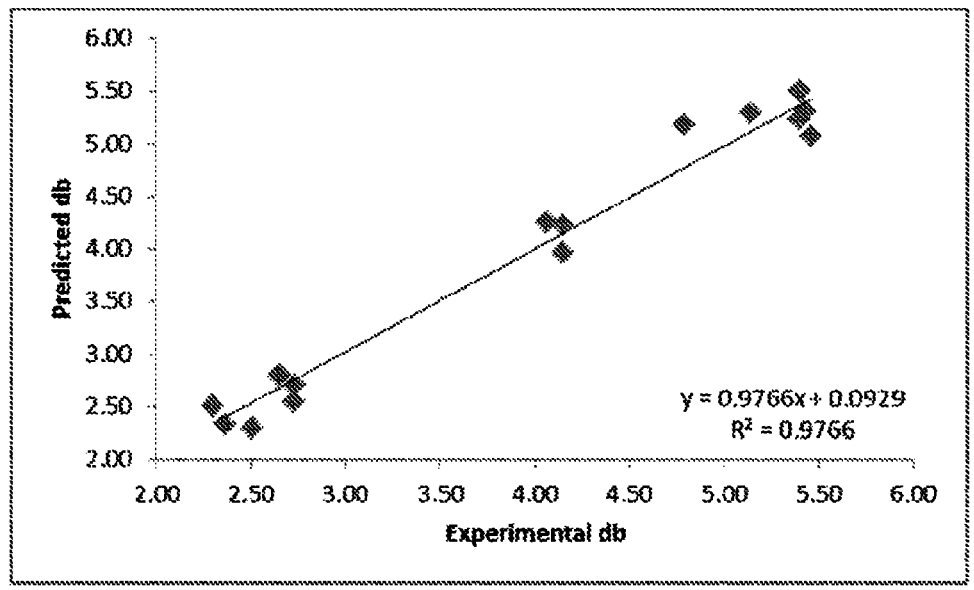
FIG. 6 shows a graph of predicted Db values vs. experimental Db values for a molded article prepared from a polydimethylsiloxane-polycarbonate block copolymer.

A graph of predicted Db vs. experimental Db is shown in FIG. 6. Data are shown below in Table 6.

TABLE 6

| Exp | Predicted |
|---|---|
| 2.51 | 2.30 |
| 2.30 | 2.51 |
| 2.36 | 2.33 |
| 2.73 | 2.70 |
| 2.65 | 2.79 |
| 2.65 | 2.79 |
| 2.73 | 2.55 |
| 4.15 | 4.23 |
| 4.15 | 3.97 |
| 4.06 | 4.25 |
| 5.46 | 5.08 |
| 5.40 | 5.23 |
| 5.40 | 5.50 |
| 4.79 | 5.18 |
| 5.14 | 5.30 |
| 5.43 | 5.31 |
| 5.43 | 5.31 | wherein: S=0.21, R-Sq=97.7%, R-Sq(adj)=97.3%, L=% Low Mw, H—Si=% High Mw, and S=standard deviation.

Example 6

Black Color Intensity Versus Block Copolymer PDI

Figure 7:
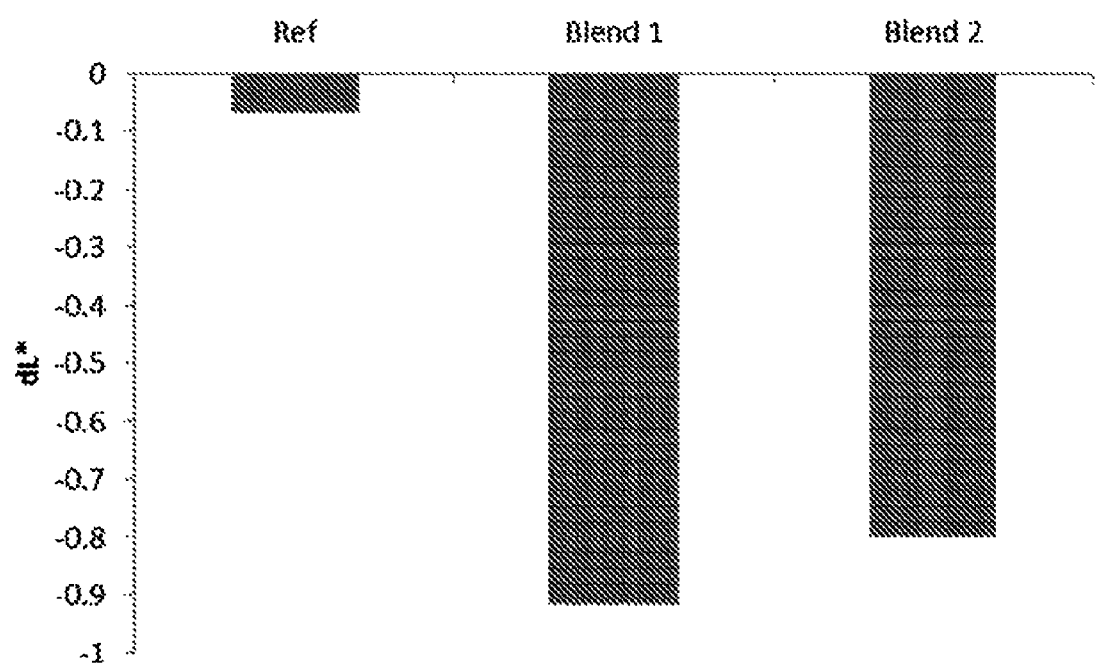
FIG. 7 shows a graph of dL for various formulations.

Block copolymers were used to prepare 2.5 mm plaques by molding at 300° C. The molding machine was first cleaned with standard polycarbonate (Mw of ca. 30000 g/mol). Using the molded plaques, L* values were obtained using a Macbeth COLOR-EYE™ 7000A reference spectrophotometer. Using a L* reference value of 28.535, the dL* was then calculated subtracting the measured value on the 2.5 mm plaque to the reference value. A negative dL* indicates that the molded article has a more intense black coloration than the reference. A positive dL* indicates a less black coloration than the reference. See FIG. 7, wherein the PDI of "Low PDI 1" and "Low PDI 2" is 1.8, and the PDI of "Ref" is 2.3. Formulations made with low PDI EC-PDMS show better black color than the formulation made with high PDI EC-PDMS. The formulations of Low PDI 1, Low PDI 2, and Ref, are shown in Table 7.

TABLE 7

| Item Description | Unit | Ref | Blend 1 | Blend 2 |
|---|---|---|---|---|
| PC105 | % | 38.01 | 38.01 | 38.01 |
| PC175 | % | 38.01 | 38.01 | 38.01 |
| Ref | % | 22.20 | | |
| Low PDI 1 | % | | 22.20 | |
| Low PDI 2 | % | | | 22.20 |
| KSS | % | 0.30 | 0.30 | 0.30 |
| TSAN | % | 0.30 | 0.30 | 0.30 |

TABLE 7-continued

| Item Description | Unit | Ref | Blend 1 | Blend 2 |
|---|---|---|---|---|
| PETS | % | 0.30 | 0.30 | 0.30 |
| UVA 234 | % | 0.30 | 0.30 | 0.30 |
| Phosphite | % | 0.09 | 0.09 | 0.09 |
| Carbon black | % | 0.50 | 0.50 | 0.50 |
| Formulation Total | % | 100.00 | 100.00 | 100.00 |

For reasons of completeness, various aspects of the invention are set out in the following numbered clauses:

Clause 1. A process for preparing a polydiorganosiloxane-polycarbonate block copolymer, the process comprising:
(a) providing a composition comprising hydroxyaryl end-capped polydiorganosiloxane monomers having the following formula (Ia):

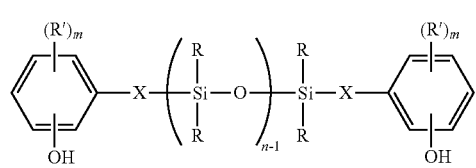

wherein:
each R is independently a $C_1$-$C_{13}$ monovalent organic group;
each X is independently a $C_2$-$C_4$ alkylenyl group;
each R' is independently selected from the group consisting of halo, cyano, nitro, $C_1$-$C_8$ alkyl, $C_1$-$C_8$ alkoxy, $C_1$-$C_8$ thioalkoxy, $C_2$-$C_8$ alkenyl, $C_2$-$C_8$ alkenyloxy, $C_3$-$C_8$ cycloalkyl, $C_3$-$C_8$ cycloalkyloxy, $C_6$-$C_{10}$ aryl, $C_6$-$C_{10}$ aryloxy, $C_7$-$C_{12}$ arylalkyl, and $C_7$-$C_{12}$ arylalkoxy;
each m is independently 0, 1, 2, 3 or 4; and
n is about 2 to about 200;
wherein the composition has a polydispersity index (Mw/Mn) of less than 2.2, as measured by size exclusion chromatography with ultraviolet (UV) and refractive index (RI) detection; and
wherein the composition has a % low molecular weight fraction of less than 15%; and
(b) reacting the composition with a carbonate precursor and a dihydroxy monomer of formula (ia):

$$HO-R^1-OH \quad (ia)$$

wherein $R^1$ comprises an aliphatic, alicyclic, or aromatic group, or any combination thereof;
to form the polydiorganosiloxane-polycarbonate block copolymer.

Clause 2. The process of clause 1, wherein the polydiorganosiloxane is present in the polydiorganosiloxane-polycarbonate block copolymer in an amount of about 2 wt % to about 25 wt % based on the total weight of the polydiorganosiloxane-polycarbonate block copolymer.

Clause 3. The process of clause 1 or 2, wherein a molded article made from the polydiorganosiloxane-polycarbonate block copolymer has a % haze of less than 1.5 at 3.15 mm thickness.

Clause 4. The process of any of clauses 1-3, wherein a molded article made from the polydiorganosiloxane-polycarbonate block copolymer has a Db of less than 4.5 at 3.15 mm thickness.

Clause 5. The process of any of clauses 1-4, wherein each R is independently a $C_1$-$C_4$ alkyl group.

Clause 6. The process of any of clauses 1-5, wherein each R is methyl.

Clause 7. The process of any of clauses 1-6, wherein each X is —$CH_2CH_2CH_2$—.

Clause 8. The process of any of clauses 1-7, wherein n is about 30 to about 200, about 30 to about 100, about 70 to about 110, or about 40 to about 50.

Clause 9. The process of any of clauses 1-7, wherein n is about 43 to about 47.

Clause 10. The process of any of clauses 1-7, wherein n is about 41 to about 45.

Clause 11. The process of any of clauses 9-10, wherein the composition has % high molecular weight fraction of less than 28%.

Clause 12. The process of any of clauses 1-11, wherein each m is 1.

Clause 13. The process of any of clauses 1-12, wherein each R' is $C_1$-$C_8$-alkoxy.

Clause 14. The process of any of clauses 1-13, wherein each R' is methoxy.

Clause 15. The process of any of clauses 1-14, wherein the monomer of formula (Ia) has the following formula (Ib):

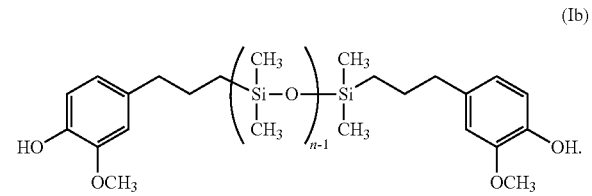

Clause 16. The process of any of clauses 1-14, wherein the monomer of formula (Ia) has the following formula (Ic):

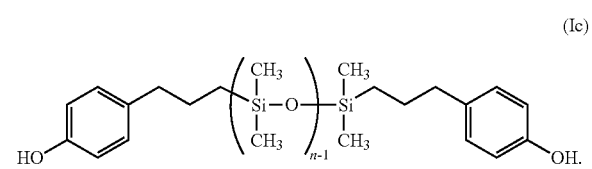

Clause 17. The process of any of clauses 1-14, wherein the monomer of formula (Ia) has the following formula (Id):

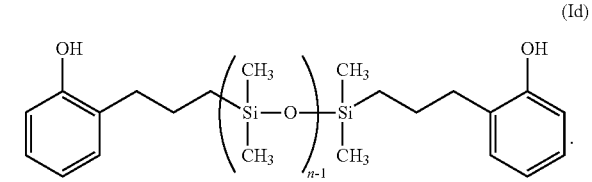

Clause 18. The process of any of clauses 1-17, wherein the composition has a polydispersity index of less than 2.0.

Clause 19. The process of any of clauses 1-18, wherein the composition has a polydispersity index of less than 1.7.

Clause 20. The process of any of clauses 1-19, wherein the composition has a % low molecular weight fraction of less than 14%.

Clause 21. The process of any of clauses 1-20, wherein the composition has a % low molecular weight fraction of less than 12%.

Clause 22. The process of any of clauses 1-21, wherein the composition has % high molecular weight fraction of less than 26%.

Clause 23. The process of any of clauses 1-22, wherein the composition has % high molecular weight fraction of less than 24%.

Clause 24. The process of any of clauses 1-23, wherein the compound of formula (ia) has the following formula (IIa):

$$HO-A^1-Y-A^2-OH \quad (IIa)$$

wherein:
each of $A^1$ and $A^2$ comprises a monocyclic divalent arylene group; and
Y is a bridging group comprising one or two member atoms.

Clause 25. The process of clause 24, wherein $A^1$ and $A^2$ are each p-phenylene groups.

Clause 26. The process of any of clauses 24-25, wherein Y is —C(CH$_3$)$_2$—.

Clause 27. The process of any of clauses 24-26, wherein the compound of formula (IIa) has the following formula:

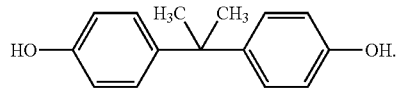 [SMILES: CC(C)(c1ccc(O)cc1)c1ccc(O)cc1]

Clause 28. The process of any of clauses 1-27, wherein the carbonate precursor is a carbonyl chloride or carbonyl bromide.

Clause 29. The process of any of clauses 1-28, wherein the carbonate precursor is phosgene.

Clause 30. The process of any of clauses 1-15 and 18-29, wherein the block copolymer comprises at least one block having the formula (Ie):

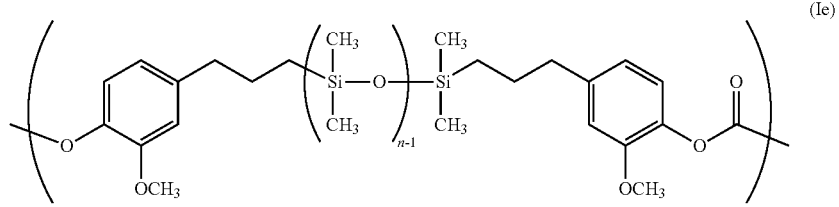

and at least one block having the formula (IIb):

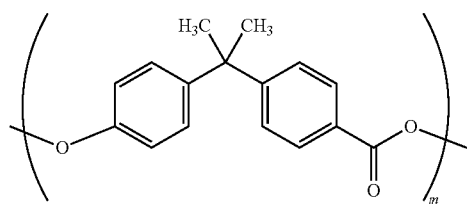

wherein m is about 10 to about 45.

Clause 31. The process of any of clauses 1-30, wherein the polydiorganosiloxane is present in the polydiorganosiloxane-polycarbonate block copolymer in an amount of about 2 wt % to about 8 wt % based on the total weight of the polydiorganosiloxane-polycarbonate block copolymer.

Clause 32. The process of any of clauses 1-31, wherein the polydiorganosiloxane is present in the polydiorganosiloxane-polycarbonate block copolymer in an amount of about 4 wt % to about 8 wt % based on the total weight of the polydiorganosiloxane-polycarbonate block copolymer.

Clause 33. The process of any of clauses 1-32 wherein the polydiorganosiloxane is present in the polydiorganosiloxane-polycarbonate block copolymer in an amount of about 5 wt % to about 7 wt % based on the total weight of the polydiorganosiloxane-polycarbonate block copolymer.

Clause 34. The process of any of clauses 1-33, wherein a molded article made from the polydiorganosiloxane-polycarbonate block copolymer has a % haze of less than 1.0.

Clause 35. The process of any of clauses 1-34, wherein a molded article made from the polydiorganosiloxane-polycarbonate block copolymer has a Db of less than 4.0 at 3.15 mm thickness.

Clause 36. The process of any of clauses 1-35, wherein a molded article made from the polydiorganosiloxane-polycarbonate block copolymer has a Db of less than 3.0 at 3.15 mm thickness.

Clause 37. The process of any of clauses 1-36, wherein a molded article made from the polydiorganosiloxane-polycarbonate block copolymer has a Db of less than 2.0 at 3.15 mm thickness.

Clause 38. The process of any of clauses 1-37, wherein a % haze of a molded article made from the polydiorganosiloxane-polycarbonate block copolymer satisfies the following equation: haze=−2.39+0.0525 (% low molecular weight fraction)+0.127 (% high molecular weight fraction).

Clause 39. The process of any of clauses 1-38, wherein a Db of a molded article made from the polydiorganosiloxane-polycarbonate block copolymer satisfies the following equation:

$Db=-2.83+0.165$(% low molecular weight fraction)+ $0.191$(% high molecular weight fraction).

Clause 40. A process for preparing a polydiorganosiloxane-polycarbonate block copolymer, the process comprising:
(a) providing a composition comprising hydroxyaryl endcapped polydiorganosiloxane monomers having the following formula (Ia):

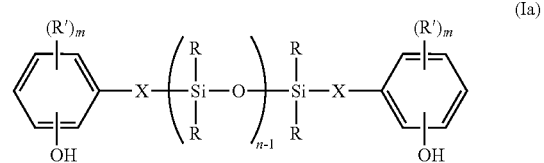

wherein:
    each R is independently a $C_1$-$C_{13}$ monovalent organic group;
    each X is independently a $C_2$-$C_4$ alkylenyl group;
    each R' is independently selected from the group consisting of halo, cyano, nitro, $C_1$-$C_8$ alkyl, $C_1$-$C_8$ alkoxy, $C_1$-$C_8$ thioalkoxy, $C_2$-$C_8$ alkenyl, $C_2$-$C_8$ alkenyloxy, $C_3$-$C_8$ cycloalkyl, $C_3$-$C_8$ cycloalkyloxy, $C_6$-$C_{10}$ aryl, $C_6$-$C_{10}$ aryloxy, $C_7$-$C_{12}$ arylalkyl, and $C_7$-$C_{12}$ arylalkoxy;
    each m is independently 0, 1, 2, 3 or 4; and
    n is about 2 to about 200;
    wherein the composition has a polydispersity index (Mw/Mn) of less than 2.3, as measured by size exclusion chromatography with ultraviolet (UV) and refractive index (RI) detection; and
    wherein the composition has a % low molecular weight fraction of less than 15%; and
(b) reacting the composition with a carbonate precursor and a dihydroxy monomer of formula (ia):

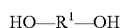
HO—$R^1$—OH        (ia)

wherein $R^1$ comprises an aliphatic, alicyclic, or aromatic group, or any combination thereof;
to form the polydiorganosiloxane-polycarbonate block copolymer.

Clause 41. The process of clause 40, wherein the polydiorganosiloxane is present in the polydiorganosiloxane-polycarbonate block copolymer in an amount of about 2 wt % to about 25 wt % based on the total weight of the polydiorganosiloxane-polycarbonate block copolymer.

Clause 42. The process of clause 40 or 41, wherein a molded article made from the polydiorganosiloxane-polycarbonate block copolymer has a % haze of less than 1.5 at 3.15 mm thickness.

Clause 43. The process of any of clauses 40-42, wherein a molded article made from the polydiorganosiloxane-polycarbonate block copolymer has a Db of less than 4.5 at 3.15 mm thickness.

Clause 44. The process of any of clauses 40-43, wherein each R is independently a $C_1$-$C_4$ alkyl group.

Clause 45. The process of any of clauses 40-44, wherein each R is methyl.

Clause 46. The process of any of clauses 40-45, wherein each X is —$CH_2CH_2CH_2$—.

Clause 47. The process of any of clauses 40-46, wherein n is about 30 to about 200, about 30 to about 100, about 70 to about 110, or about 40 to about 50.

Clause 48. The process of any of clauses 40-46, wherein n is about 43 to about 47.

Clause 49. The process of any of clauses 40-46, wherein n is about 41 to about 45.

Clause 50. The process of any of clauses 48-49, wherein the composition has % high molecular weight fraction of less than 28%.

Clause 51. The process of any of clauses 40-50, wherein each m is 1.

Clause 52. The process of any of clauses 40-51, wherein each R' is $C_1$-$C_8$-alkoxy.

Clause 53. The process of any of clauses 40-52, wherein each R' is methoxy.

Clause 54. The process of any of clauses 40-53, wherein the monomer of formula (Ia) has the following formula (Ib):

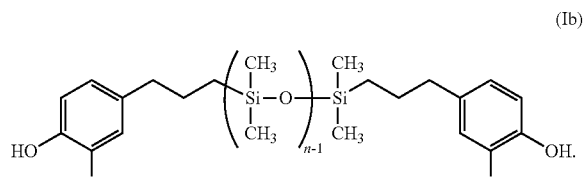

Clause 55. The process of any of clauses 40-53, wherein the monomer of formula (Ia) has the following formula (Ic):

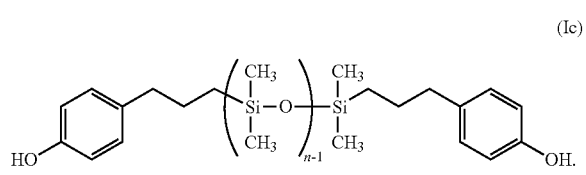

Clause 56. The process of any of clauses 40-53, wherein the monomer of formula (Ia) has the following formula (Id):

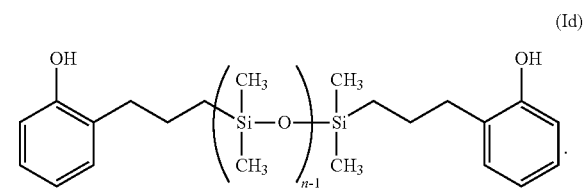

Clause 57. The process of any of clauses 40-56, wherein the composition has a polydispersity index of less than 2.0.

Clause 58. The process of any of clauses 40-57, wherein the composition has a polydispersity index of less than 1.7.

Clause 59. The process of any of clauses 40-58, wherein the composition has a % low molecular weight fraction of less than 14%.

Clause 60. The process of any of clauses 40-59, wherein the composition has a % low molecular weight fraction of less than 12%.

Clause 61. The process of any of clauses 40-60, wherein the composition has % high molecular weight fraction of less than 26%.

Clause 62. The process of any of clauses 40-61, wherein the composition has % high molecular weight fraction of less than 24%.

Clause 63. The process of any of clauses 40-62, wherein the compound of formula (ia) has the following formula (IIa):

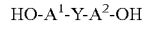
HO-$A^1$-Y-$A^2$-OH        (IIa)

wherein:
    each of $A^1$ and $A^2$ comprises a monocyclic divalent arylene group; and
    Y is a bridging group comprising one or two member atoms.

Clause 64. The process of clause 63, wherein $A^1$ and $A^2$ are each p-phenylene groups.

Clause 65. The process of any of clauses 63-64, wherein Y is —$C(CH_3)_2$—.

Clause 66. The process of any of clauses 63-65, wherein the compound of formula (IIa) has the following formula:

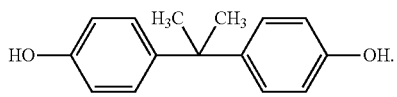

Clause 67. The process of any of clauses 40-66, wherein the carbonate precursor is a carbonyl chloride or carbonyl bromide.

Clause 68. The process of any of clauses 40-67, wherein the carbonate precursor is phosgene.

Clause 69. The process of any of clauses 40-54 and 57-68, wherein the block copolymer comprises at least one block having the formula (Ie):

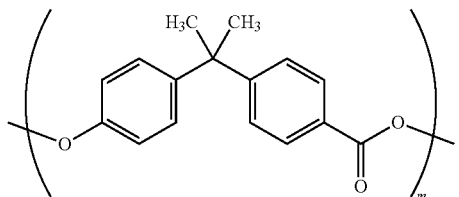

and at least one block having the formula (IIb):

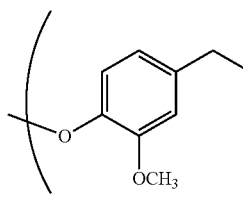

wherein m is about 10 to about 45.

Clause 70. The process of any of clauses 40-69, wherein the polydiorganosiloxane is present in the polydiorganosiloxane-polycarbonate block copolymer in an amount of about 2 wt % to about 8 wt % based on the total weight of the polydiorganosiloxane-polycarbonate block copolymer.

Clause 71. The process of any of clauses 40-70, wherein the polydiorganosiloxane is present in the polydiorganosiloxane-polycarbonate block copolymer in an amount of about 4 wt % to about 8 wt % based on the total weight of the polydiorganosiloxane-polycarbonate block copolymer.

Clause 72. The process of any of clauses 40-71 wherein the polydiorganosiloxane is present in the polydiorganosiloxane-polycarbonate block copolymer in an amount of about 5 wt % to about 7 wt % based on the total weight of the polydiorganosiloxane-polycarbonate block copolymer.

Clause 73. The process of any of clauses 40-72, wherein a molded article made from the polydiorganosiloxane-polycarbonate block copolymer has a % haze of less than 1.0.

Clause 74. The process of any of clauses 40-73, wherein a molded article made from the polydiorganosiloxane-polycarbonate block copolymer has a Db of less than 4.0 at 3.15 mm thickness.

Clause 75. The process of any of clauses 40-74, wherein a molded article made from the polydiorganosiloxane-polycarbonate block copolymer has a Db of less than 3.0 at 3.15 mm thickness.

Clause 76. The process of any of clauses 40-75, wherein a molded article made from the polydiorganosiloxane-polycarbonate block copolymer has a Db of less than 2.0 at 3.15 mm thickness.

Clause 77. The process of any of clauses 40-76, wherein a % haze of a molded article made from the polydiorganosiloxane-polycarbonate block copolymer satisfies the following equation:

haze=−2.39+0.0525(% low molecular weight fraction)+0.127(% high molecular weight fraction).

Clause 78. The process of any of clauses 40-77, wherein a Db of a molded article made from the polydiorganosiloxane-polycarbonate block copolymer satisfies the following equation:

Db=−2.83+0.165(% low molecular weight fraction)+0.191(% high molecular weight fraction).

Clause 79. The process of clause 1 or clause 40, wherein a 2.5 mm plaque made from the polydiorganosiloxane-polycarbonate block copolymer has a dL* value of less than or equal to −0.1, wherein the dL* value is calculated by substracting a measured L* value from a L* reference value.

Clause 80. A process for analyzing a chemical composition distribution of a hydroxyaryl end-capped polydiorganosiloxane monomer composition, the process comprising:

(a) providing a composition comprising hydroxyaryl end-capped polydiorganosiloxane monomers having the following formula (Ia):

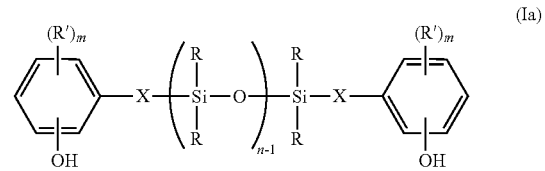

wherein:
each R is independently a $C_1$-$C_{13}$ alkyl group;
each X is independently a $C_2$-$C_4$ alkylenyl group;
each R' is independently selected from the group consisting of halo, cyano, nitro, $C_1$-$C_8$ alkyl, $C_1$-$C_8$ alkoxy, $C_1$-$C_8$ thioalkoxy, $C_2$-$C_8$ alkenyl, $C_2$-$C_8$ alkenyloxy, $C_3$-$C_8$ cycloalkyl, $C_3$-$C_8$ cycloalkyloxy, $C_6$-$C_{10}$ aryl, $C_6$-$C_{10}$ aryloxy, $C_7$-$C_{12}$ arylalkyl, and $C_7$-$C_{12}$ arylalkoxy;
each m is independently 0, 1, 2, 3 or 4; and
n is about 2 to about 200;

(b) performing size exclusion chromatography on the composition and detecting at least one of the refractive index (RI) and ultraviolet absorbance (UV) signals of the monomers at a retention time; and (c) analyzing at least one of the RI and UV signals from the monomers using an indirect classical least squares analysis to determine at least one of a concentration of polydiorganosiloxane units and a concentration of hydroxyaryl end-capping groups; and (d) obtaining the chemical composition distribution of at least one of the polydiorganosiloxane units and hydroxyaryl end capping groups in the composition based on at least one of the RI and UV signals at one or more retention times.

Clause 81. The process of clause 80, wherein the percent of molecular weight fractions is determined based on the chemical composition distribution.

Clause 82. The process of any of clauses 80-81, wherein each R is independently a $C_1$-$C_4$ alkyl group.

Clause 83. The process of any of clauses 80-82, wherein each R is methyl.

Clause 84. The process of any of clauses 80-83, wherein each X is —$CH_2CH_2CH_2$—.

Clause 85. The process of any of clauses 80-84, wherein n is about 30 to about 200, or optionally about 30 to about 100.

Clause 86. The process of any of clauses 80-84, wherein n is about 70 to about 110.

Clause 87. The process of any of clauses 80-84, wherein n is about 40 to about 50.

Clause 88. The process of any of clauses 80-84, wherein n is about 43 to about 47.

Clause 89. The process of any of clauses 80-84, wherein n is about 41 to about 45.

Clause 90. The process of any of clauses 80-89, wherein each m is 1.

Clause 91. The process of any of clauses 80-90, wherein each R' is $C_{80}$-$C_8$-alkoxy.

Clause 92. The process of any of clauses 80-91, wherein each R' is methoxy.

Clause 93. The process of any of clauses 80-92, wherein the monomer of formula (Ia) has the following formula (Ib):

(Ib)

Clause 94. The process of any of clauses 80-92, wherein the monomer of formula (Ia) has the following formula (Ic):

(Ic)

Clause 95. The process of any of clauses 80-92, wherein the monomer of formula (Ia) has the following formula (Id):

(Id)

Clause 96. The process of any of clauses 80-95, further comprising calculating a polydispersity index of the composition.

Clause 97. The process of any of clauses 80-96, wherein the composition has a polydispersity index of less than or equal to 2.2, or less than or equal to 2.0.

Clause 98. The process of any of clauses 80-97, further comprising calculating a percentage of monomers in a low molecular weight fraction of the composition based on the chemical composition distribution for the hydroxyaryl end-capping groups.

Clause 99. The process of clause 98, wherein the low molecular weight fraction comprises monomers having a molecular weight of less than or equal to 3000 g/mol based on a polystyrene standard curve.

Clause 100. The process of any of clauses 80-99, further comprising calculating a percentage of monomers in a high molecular weight fraction of the composition based on the chemical composition distribution for the polydiorganosiloxane units.

Clause 101. The process of clause 100, wherein the high molecular weight fraction comprises monomers having a molecular weight of greater than about 22000 g/mol based on a polystyrene standard curve.

Clause 102. A process for preparing a polydiorganosiloxane-polycarbonate block copolymer, comprising:
(a) selecting a composition comprising polydiorganosiloxane monomers having a polydispersity index (Mw/Mn) of less than or equal to 2.2, having the following formula (Ia):

(Ia)

wherein:
each R is independently a $C_1$-$C_{13}$ monovalent organic group;
each X is independently a $C_2$-$C_4$ alkylenyl group;
each R' is independently selected from the group consisting of halo, cyano, nitro, $C_1$-$C_8$ alkyl, $C_1$-$C_8$ alkoxy, $C_1$-$C_8$ thioalkoxy, $C_2$-$C_8$ alkenyl, $C_2$-$C_8$ alkenyloxy, $C_3$-$C_8$ cycloalkyl, $C_3$-$C_8$ cycloalkyloxy, $C_6$-$C_{10}$ aryl, $C_6$-$C_{10}$ aryloxy, $C_7$-$C_{12}$ arylalkyl, and $C_7$-$C_{12}$ arylalkoxy;
each m is independently 0, 1, 2, 3 or 4; and
n is about 2 to about 200;
wherein the composition is selected by:
i) performing size exclusion chromatography on the composition and detecting at least one of the refractive index (RI) and ultraviolet absorbance (UV) signals of the monomers at a retention time;

ii) analyzing at least one of the RI and UV signals from the monomers using an indirect classical least squares analysis to determine a concentration of at least one of the polydiorganosiloxane units and the hydroxyaryl end-capping groups;

iii) obtaining the chemical composition distribution of at least one of the polydiorganosiloxane units and hydroxyaryl end capping groups in the composition based on at least one of the RI and UV signals at one or more retention times; and iv) selecting the composition if it has a polydispersity index of (Mw/Mn) of less than or equal to 2.2; and (b) reacting the selected composition comprising monomers of formula (Ia) with a carbonate precursor and a dihydroxy monomer of formula (ia):

HO—R$^1$—OH    (ia)

wherein R$^1$ comprises an aliphatic, alicyclic, or aromatic group, or any combination thereof;
to form the polydiorganosiloxane-polycarbonate block copolymer.

Clause 103. The process of clause 102, wherein the polydiorganosiloxane is present in the polydiorganosiloxane-polycarbonate block copolymer in an amount of about 2 wt % to about 25 wt % based on the total weight of the polydiorganosiloxane-polycarbonate block copolymer.

Clause 104. The process of clause 102 or 103, wherein a molded article made from the polydiorganosiloxane-polycarbonate block copolymer has a % haze of less than 1.5 at 3.15 mm thickness.

Clause 105. The process of any of clauses 102-104, wherein a molded article made from the polydiorganosiloxane-polycarbonate block copolymer has a Db of less than 4.5 at 3.15 mm thickness.

Clause 106. The process of any of clauses 102-105, wherein each R is independently a C$_1$-C$_4$ alkyl group.

Clause 107. The process of any of clauses 102-106, wherein each R is methyl.

Clause 108. The process of any of clauses 102-107, wherein each X is —CH$_2$CH$_2$CH$_2$—.

Clause 109. The process of any of clauses 102-108, wherein n is about 30 to about 200, about 30 to about 100, about 70 to about 110, or about 40 to about 50.

Clause 110. The process of any of clauses 102-108, wherein n is about 43 to about 47.

Clause 111. The process of any of clauses 102-108, wherein n is about 41 to about 45.

Clause 112. The process of any of clauses 102-111, wherein each m is 1.

Clause 113. The process of any of clauses 102-112, wherein each R' is C$_1$-C$_8$-alkoxy.

Clause 114. The process of any of clauses 102-113, wherein each R' is methoxy.

Clause 115. The process of any of clauses 102-114, wherein the monomer of formula (Ia) has the following formula (Ib):

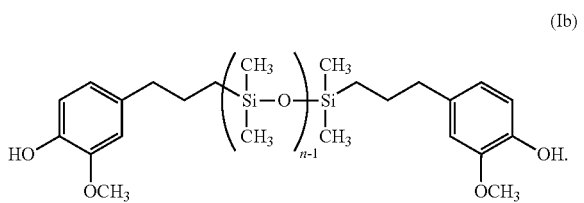
(Ib)

Clause 116. The process of any of clauses 102-114, wherein the monomer of formula (Ia) has the following formula (Ic):

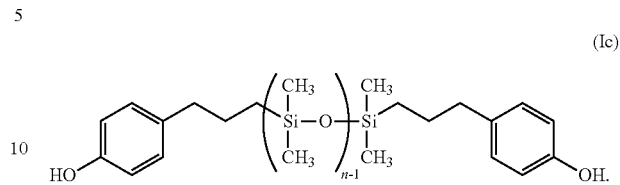
(Ic)

Clause 117. The process of any of clauses 102-114, wherein the monomer of formula (Ia) has the following formula (Id):

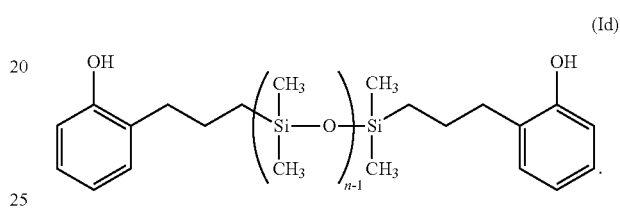
(Id)

Clause 118. The process of any of clauses 102-117, wherein the composition has a polydispersity index of less than 2.0.

Clause 119. The process of any of clauses 102-118, further comprising calculating a percentage of monomers in a low molecular weight fraction from the chemical composition distribution for the hydroxyaryl end-capping groups.

Clause 120. The process of clause 119, wherein the low molecular weight fraction comprises monomers having a molecular weight of less than or equal to 3000 g/mol based on a polystyrene standard curve.

Clause 121. The process any of clauses 98-120, wherein the composition has a % low molecular weight fraction of less than 14%.

Clause 122. The process of any of clauses 98-121, wherein the composition has a % low molecular weight fraction of less than 12%.

Clause 123. The process of any of clauses 102-122, further comprising calculating a percentage of monomers in a high molecular weight fraction from the chemical composition distribution for the polydiorganosiloxane units.

Clause 124. The process of clause 123, wherein the high molecular weight fraction comprises monomers having a molecular weight of greater than about 22000 g/mol based on a polystyrene standard curve.

Clause 125. The process of clause any of clauses 102-124, wherein the composition has % high molecular weight fraction of less than 26%.

Clause 126. The process of any of clauses 102-125, wherein the composition has % high molecular weight fraction of less than 24%.

Clause 127. The process of any of clauses 102-126, wherein the compound of formula (ia) has the following formula (IIa):

HO-A$^1$-Y-A$^2$-OH    (IIa)

wherein:
each of A$^1$ and A$^2$ comprises a monocyclic divalent arylene group; and
Y is a bridging group comprising one or two member atoms.

Clause 128. The process of clause 127, wherein $A^1$ and $A^2$ are each p-phenylene groups.

Clause 129. The process of any of clauses 127-128, wherein Y is $-C(CH_3)_2-$.

Clause 130. The process of any of clauses 127-129, wherein the compound of formula (IIa) has the following formula:

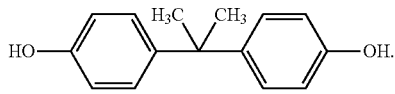 [SMILES: CC(C)(c1ccc(O)cc1)c1ccc(O)cc1]

Clause 131. The process of any of clauses 102-130, wherein the carbonate precursor is a carbonyl chloride or a carbonyl bromide.

Clause 132. The process of any of clauses 102-131, wherein the carbonate precursor is phosgene.

Clause 133. The process of any of clauses 102-115 and 118-132, wherein the block copolymer comprises at least one block having the formula (Ie):

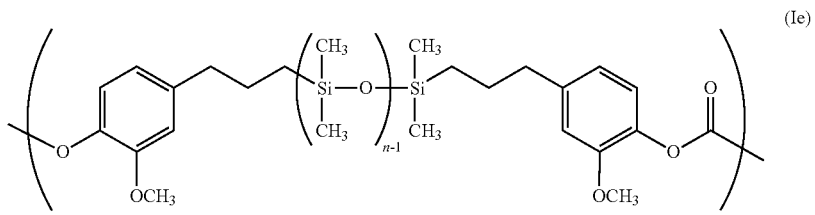

and at least one block having the formula (IIb):

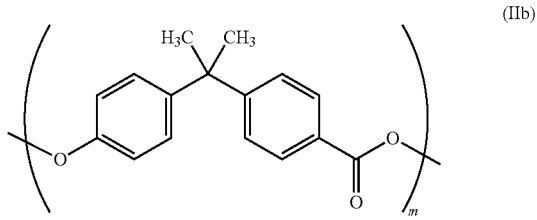

wherein m is about 10 to about 45.

Clause 134. The process of any of clauses 102-133, wherein the polydiorganosiloxane is present in the polydiorganosiloxane-polycarbonate block copolymer in an amount of about 2 wt % to about 8 wt % based on the total weight of the polydiorganosiloxane-polycarbonate block copolymer.

Clause 135. The process any of clauses 102-134, wherein the polydiorganosiloxane is present in the polydiorganosiloxane-polycarbonate block copolymer in an amount of about 4 wt % to about 8 wt % based on the total weight of the polydiorganosiloxane-polycarbonate block copolymer.

Clause 136. The process of any of clauses 102-135, wherein the polydiorganosiloxane is present in the polydiorganosiloxane-polycarbonate block copolymer in an amount of about 5 wt % to about 7 wt % based on the total weight of the polydiorganosiloxane-polycarbonate block copolymer.

Clause 137. The process of any of clauses 102-136, wherein a molded article made from the polydiorganosiloxane-polycarbonate block copolymer has a % haze of less than 1.0.

Clause 138. The process of any of clauses 102-137, wherein a molded article made from the polydiorganosiloxane-polycarbonate block copolymer has a Db of less than 4.0 at 3.15 mm thickness.

Clause 139. The process of any of clauses 102-138, wherein a molded article made from the polydiorganosiloxane-polycarbonate block copolymer has a Db of less than 3.0 at 3.15 mm thickness.

Clause 140. The process of any of clauses 102-139, wherein a molded article made from the polydiorganosiloxane-polycarbonate block copolymer has a Db of less than 2.0 at 3.15 mm thickness.

Clause 141. The process of any of clauses 102-140, wherein a % haze of a molded article made from the polydiorganosiloxane-polycarbonate block copolymer satisfies the following equation:

haze=−2.39+0.0525(% low molecular weight fraction)+0.127(% high molecular weight fraction).

Clause 142. The process of any of clauses 102-141, wherein a Db of a molded article made from the polydiorganosiloxane-polycarbonate block copolymer satisfies the following equation:

$Db$=−2.83+0.165(% low molecular weight fraction)+0.191(% high molecular weight fraction).

Clause 143. The process of clause 102, wherein a 2.5 mm plaque made from the polydiorganosiloxane-polycarbonate block copolymer has a dL* value of less than or equal to −0.1, wherein the dL* value is calculated by subtracting a measured L* value from a L* reference value.

What is claimed is:

1. A process for preparing a polydiorganosiloxane-polycarbonate block copolymer, the process comprising:
   (a) providing a composition comprising hydroxyaryl end-capped polydiorganosiloxane monomers having the following formula (Ia):

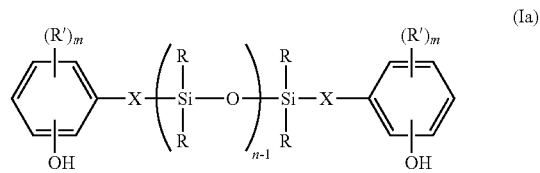

wherein: each R is independently a $C_1$-$C_{13}$ monovalent organic group;
each X is independently a $C_2$-$C_4$ alkylenyl group;
each R' is independently selected from the group consisting of halo, cyano, nitro, $C_1$-$C_8$ alkyl, $C_1$-$C_8$ alkoxy, $C_1$-$C_8$ thioalkoxy, $C_2$-$C_8$ alkenyl, $C_2$-$C_8$ alkenyloxy, $C_3$-$C_8$ cycloalkyl, $C_3$-$C_8$ cycloalkyloxy, $C_6$-$C_{10}$aryl, $C_6$-$C_{10}$ aryloxy, $C_7$-$C_{12}$ arylalkyl, and $C_7$-$C_{12}$ arylalkoxy;

each m is independently 0, 1, 2, 3 or 4; and n is about 2 to about 200;

wherein the composition has a polydispersity index (Mw/Mn) of less than 2.2, as measured by size exclusion chromatography with ultraviolet (UV) and refractive index (RI) detection; and wherein the composition has a % low molecular weight fraction of less than 15%; and (b) reacting the composition with a carbonate precursor and a dihydroxy monomer of formula (ia): HO—$R^1$—OH (ia)

wherein $R^1$ comprises an aliphatic, alicyclic, or aromatic group, or any combination thereof;

to form the polydiorganosiloxane-polycarbonate block copolymer.

2. A process for preparing a polydiorganosiloxane-polycarbonate block copolymer, the process comprising:

(a) providing a composition comprising hydroxyaryl end-capped polydiorganosiloxane monomers having the following formula (Ia):

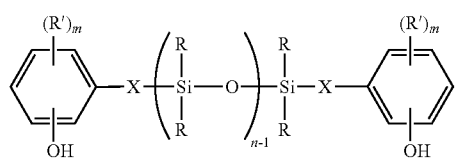

(Ia)

wherein: each R is independently a $C_1$-$C_{13}$ monovalent organic group;

each X is independently a $C_2$-$C_4$ alkylenyl group;

each R' is independently selected from the group consisting of halo, cyano, nitro, $C_1$-$C_8$ alkyl, $C_1$-$C_8$ alkoxy, $C_1$-$C_8$ thioalkoxy, $C_2$-$C_8$ alkenyl, $C_2$-$C_8$ alkenyloxy, $C_3$-$C_8$cycloalkyl, $C_3$-$C_8$cycloalkyloxy, $C_6$-$C_{10}$ aryl, $C_6$-$C_{10}$ aryloxy, $C_7$-$C_{12}$ arylalkyl, and $C_7$-$C_{12}$ arylalkoxy;

each m is independently 0, 1, 2, 3 or 4; and n is about 2 to about 200;

wherein the composition has a polydispersity index (Mw/Mn) of less than 2.3, as measured by size exclusion chromatography with ultraviolet (UV) and refractive index (RI) detection; and wherein the composition has a % low molecular weight fraction of less than 15%; and (b) reacting the composition with a carbonate precursor and a dihydroxy monomer of formula (ia): HO—$R^1$—OH (ia)

wherein $R^1$ comprises an aliphatic, alicyclic, or aromatic group, or any combination thereof;

to form the polydiorganosiloxane-polycarbonate block copolymer.

3. The process of claim 2, wherein the polydiorganosiloxane is present in the polydiorganosiloxane-polycarbonate block copolymer in an amount of about 2 wt % to about 25 wt % based on the total weight of the polydiorganosiloxane-polycarbonate block copolymer.

4. The process of claim 2, wherein a molded article made from the polydiorganosiloxane-polycarbonate block copolymer has a % haze of less than 1.5 at 3.15 mm thickness.

5. The process of claim 2, wherein a molded article made from the polydiorganosiloxane-polycarbonate block copolymer has a Db of less than 4.5 at 3.15 mm thickness.

6. The process of claim 2, wherein n is about 30 to about 200.

7. The process of claim 6, wherein the composition has % high molecular weight fraction of less than 28%.

8. The process of claim 2, wherein the monomer of formula (Ia) is formula (Ib), formula (Ic), or formula (Id):

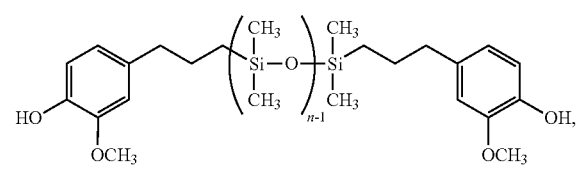

(Ib)

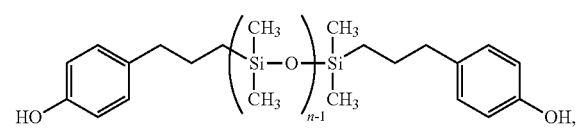

(Ic)

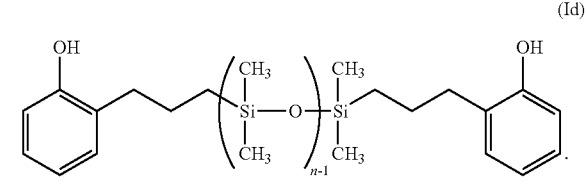

(Id)

9. The process of claim 2, wherein the composition has a polydispersity index of less than 2.0.

10. The process of claim 2, wherein the composition has a % low molecular weight fraction of less than 14%.

11. The process of claim 2, wherein the composition has % high molecular weight fraction of less than 26%.

12. The process of claim 2, wherein the compound of formula (ia) has the following formula (IIa):

HO-$A^1$-Y-$A^2$-OH (IIa)

wherein each of $A^1$ and $A^2$ comprises a monocyclic divalent arylene group, and Y is a bridging group comprising one or two member atoms.

13. The process of claim 12, wherein the compound of formula (IIa) has the following formula:

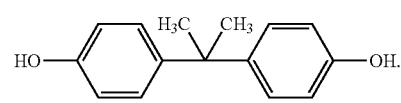

14. The process of claim 2, wherein the block copolymer comprises one block having the formula (Ie):

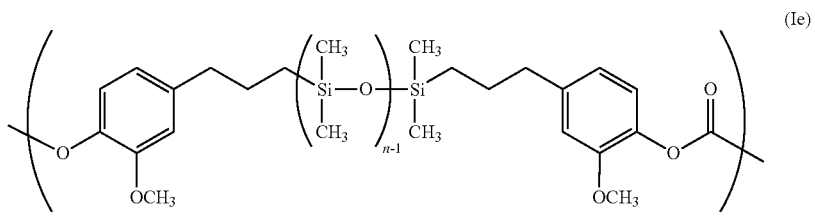

and at least one block having the formula (IIb):

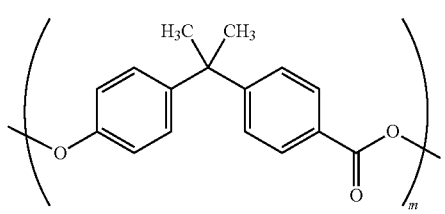

wherein m is about 10 to about 45.

15. The process of claim 2, wherein the polydiorganosiloxane is present in the polydiorganosiloxane-polycarbonate block copolymer in an amount of about 2 wt % to about 8 wt % based on the total weight of the polydiorganosiloxane-polycarbonate block copolymer.

16. The process of claim 2, wherein a molded article made from the polydiorganosiloxane-polycarbonate block copolymer has a % haze of less than 1.0.

17. The process of claim 2, wherein a molded article made from the polydiorganosiloxane-polycarbonate block copolymer has a Db of less than 4.0 at 3.15 mm thickness.

18. The process of claim 2, wherein a % haze of a molded article made from the polydiorganosiloxane-polycarbonate block copolymer satisfies the following equation: haze $=-2.39 +0.0525$(% low molecular weight fraction)$+ 0.127$(% high molecular weight fraction).

19. The process of claim 2, wherein a Db of a molded article made from the polydiorganosiloxane-polycarbonate block copolymer satisfies the following equation: Db $=-2.83 +0.165$(% low molecular weight fraction) $+0.191$(% high molecular weight fraction).

20. The process of claim 2, wherein a 2.5 mm plaque made from the polydiorganosiloxane-polycarbonate block copolymer has a $dL^*$ value of less than or equal to $-0.1$, wherein the $dL^*$ value is calculated by substracting a measured $L^*$ value from a $L^*$ reference value.

* * * * *